(12) United States Patent
Taniguchi et al.

(10) Patent No.: US 12,231,173 B2
(45) Date of Patent: Feb. 18, 2025

(54) SYMBOL DETERMINATION DEVICE AND TAP SELECTION METHOD

(71) Applicant: NIPPON TELEGRAPH AND TELEPHONE CORPORATION, Tokyo (JP)

(72) Inventors: Hiroki Taniguchi, Musashino (JP); Masanori Nakamura, Musashino (JP); Shuto Yamamoto, Musashino (JP); Yoshiaki Kisaka, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 180 days.

(21) Appl. No.: 18/021,869

(22) PCT Filed: Aug. 24, 2020

(86) PCT No.: PCT/JP2020/031852
§ 371 (c)(1),
(2) Date: Feb. 17, 2023

(87) PCT Pub. No.: WO2022/044077
PCT Pub. Date: Mar. 3, 2022

(65) Prior Publication Data
US 2023/0361881 A1    Nov. 9, 2023

(51) Int. Cl.
*H04B 10/60*    (2013.01)
*H04B 10/516*   (2013.01)

(52) U.S. Cl.
CPC ........... *H04B 10/60* (2013.01); *H04B 10/516* (2013.01)

(58) Field of Classification Search
CPC ............................. H04B 10/60; H04B 10/516
(Continued)

(56) References Cited

U.S. PATENT DOCUMENTS

| | | | | |
|---|---|---|---|---|
| 6,775,322 B1* | 8/2004 | Zangi | ................ | H04L 25/03057 375/232 |
| 7,684,481 B2* | 3/2010 | Zeng | ................. | H04L 25/03171 375/232 |
| 10,742,453 B1* | 8/2020 | Wu | ................... | H04L 25/03057 |

(Continued)

FOREIGN PATENT DOCUMENTS

| | | |
|---|---|---|
| JP | 2012-060451 A | 3/2012 |
| JP | 2013-126082 A | 6/2013 |
| JP | 2013-152532 A | 8/2013 |

(Continued)

OTHER PUBLICATIONS

Hiroki Taniguchi et al., "255-GB/s PAM-8 O-band transmission using MLSE based on nonlinear channel estimation with 20-GHz bandwidth limitation", The Institute of Electronics, Information and Communication Engineers, IEICE Technical Report OCS2019-18, (Jun. 2019).

Hiroki Taniguchi et al., "255-GB/s PAM8 O-band Transmission through 10-km SMF using simplified MLSE based on Trellis-path Limitation", The Institute of Electronics, Information and Communication Engineers, IEICE Technical Report OCS2019-65, (Jan. 2020).

(Continued)

*Primary Examiner* — Dalzid E Singh

(57) ABSTRACT

The symbol determination device generates the plurality of estimated reception symbol sequences on the basis of the estimated transfer function of the transmission line represented by the tap gain value applied to each tap of the nonlinear filter including the plurality of taps and the plurality of candidate symbol sequences, determines the transmission symbol by the maximum likelihood sequence estimation on the basis of the determination target reception symbol sequence obtained from the reception signal sequence and each of the plurality of estimated reception symbol sequences, identifies the estimated transmission (Continued)

symbol corresponding to the determination target reception symbol sequence, calculates the new tap gain values on the basis of the determination target reception symbol sequence and the identified estimated transmission symbol sequence, updates the estimated transfer function by applying the calculated tap gain values to the taps of the transmission line estimation unit, and selects the tap to be used on the basis of the magnitude of the calculated new tap gain value and the predetermined tap gain threshold value.

8 Claims, 14 Drawing Sheets

(58) Field of Classification Search
USPC .......................................................... 398/140
See application file for complete search history.

(56) References Cited

U.S. PATENT DOCUMENTS

| 2001/0026197 | A1* | 10/2001 | Tomisato | H04B 7/086 |
| | | | | 333/28 R |
| 2015/0312065 | A1* | 10/2015 | Eliaz | H04L 25/03949 |
| | | | | 375/343 |
| 2020/0389207 | A1 | 12/2020 | Taniguchi et al. | |
| 2021/0367670 | A1 | 11/2021 | Yamamoto et al. | |

FOREIGN PATENT DOCUMENTS

| WO | WO-2019/142912 A1 | 7/2019 |
| WO | WO-2020/095986 A1 | 5/2020 |

OTHER PUBLICATIONS

"Mohamed Ibnkahla et al, ""A Neural Network MLSE Receiver Based on Natural Gradiend Descent?Application to Satellite Communications"", Seventh International Symposium on Signal Processing and Its Applications, 2003. Proceedings., 2003, pp. 33-36 vol. 1, doi:10.1109/ISSPA.2003.1224633."

Hiroki Taniguchi et al, "225-Gbps PAM8 O-band Transmission through 20-km SMF using simplified MLSE based on Nonlinear Channel Estimation", CD-ROM, Sep. 1, 2020, vol. 2020, B-10-20.

Hiroki Taniguchi et al, "255-Gbps PAM-8 O-band Transmission through 10-km SMF under 14- GHz Bandwidth Limitation Using MLSE Based on Nonlinear Channel Estimation with Cutdown Volterra Kernels.", 2020 OECC, IEEE, Oct. 4, 2020, pp. 1-3.

Hiroki Taniguchi et al, "800-Gbps PAM-4 O-band Transmission through 2-km SMF using 4? LAN-WDM TOSA with MLSE Based on Nonlinear Channel Estimation and Decision Feedback", 2021, ECOC, Sep. 13, 2021, pp. 1-4.

* cited by examiner

SYMBOL DETERMINATION DEVICE AND TAP SELECTION METHOD

CROSS-REFERENCE TO RELATED APPLICATIONS

This application is a 371 U.S. National Phase of International Application No. PCT/JP2020/031852, filed on Aug. 24, 2020. The entire disclosure of the above application is incorporated herein by reference.

TECHNICAL FIELD

The present invention relates to a symbol determination device and a tap selection method.

BACKGROUND ART

In recent years, traffic transferred by the backbone network of the Internet continues to increase due to rapid spread of smart phones and tablets, increase in rich contents such as high-definition video distribution service, and the like. The use of cloud services in companies is also in progress. From these results, it has been predicted that a traffic amount of the network of both intra data center (hereinafter, referred to as "DC") and inter-DC is increased by a rate of 1.3 times.

At present, Ethernet (registered trademark) has been introduced into intra-DC and inter-DC connection system. As communication traffic increases, it is expected that it becomes difficult to increase the scale of DC at a single base. Therefore, the need for inter-DC cooperation is increased more than before, and traffic transmitted and received between DCs is further increased. In order to cope with such a situation, it is required to establish a low-cost and large-capacity short-range optical transmission technique.

In the current Ethernet registered trademark) standard, optical fiber communication is applied to a transmission line up to 40 km except for 10 GbE (Gigabit Ethernet (registered trademark))—ZR. An intensity modulation system for allocating binary information to on and off of light is used up to 100 GbE. The reception side is constituted of only a light receiver and is constituted more inexpensive than a coherent reception system used for long distance transmission.

In the 100 GbE, the transmission capacity of 100 Gbps (Gigabit per second) is realized by performing four-wave multiplexing of NRZ (Non-return-to-zero) signals of 25 GBd (GigaBaud) modulation speed and 1 bit Symbol information amount per symbol.

In the standardization of 400 GbE corresponding to the next generation of 100 GbE, a PAM4 (4-level pulse-amplitude-modulation) of 2 bits/symbol is adopted for the first time in consideration of the maintenance of the economical device configuration used in 100 GbE and the band utilization efficiency of the signal. Thus, the transmission capacity of 400 Gbps is realized by performing four-wave multiplexing of the PAM4 signal of 100 Gbps. As the standard of 400 GbE, for example, 400 GBASE-FR4, LR4 or the like is available.

In recent years, for further traffic increase in future, the standardization of 800 GbE, 1.6 TbE is scheduled. These communication speeds are scheduled by realizing, for example, 4 to 8 wavelength multiplexing of a signal of 200 Gbps with a modulation speed of 100 GBaud by adopting the PAM4 or realizing 4 to 8 wavelength multiplexing of a signal of 225 Gbps with the modulation speed of 75 GBaud by adopting a PAM8.

As a problem for further increasing the capacity, it is supposed that an influence of band limitation and wavelength dispersion of the device becomes obvious with increase in the transmission capacity, and the deterioration of the signal quality increases. For example, as shown in FIG. 13, when the transmission capacity increases and the bandwidth used increases, the frequency region 501 (the hatched region with diagonal lines) is lost due to the band limitation of the device. As shown in FIG. 14, when the transmission capacity increases, the influence of wavelength dispersion increases, and the interfering region 502 increases.

As a method for solving such a problem, there is a method of using a DAC (Digital to Analog Converter) and an ADC (Analog to Digital Converter) corresponding to a high communication speed, or using a dispersion compensation module and the like for compensating wavelength dispersion. However, since such equipment is expensive and the cost required for the equipment is high, it is a method to be avoided from an economical viewpoint. In the economical viewpoint, a desired technique is a technique that can utilize a low-cost narrow-band device by improving a multi-value, a band limit resistance, a wavelength dispersion resistance while remaining the conventional configuration of transmitter and receiver.

However, when a low-cost narrow-band device is used, for example, a driver and a light receiver have nonlinear input/output characteristics as shown in FIG. 15, and the modulator also has nonlinear input/output characteristics as shown in FIG. 16. Therefore, there is a problem that nonlinear waveform distortion occurs. When the direct detection method is used, a nonlinear loss characteristic as shown in FIG. 17 occurs in the frequency region due to the interaction between the wavelength dispersion and the square-law detection. That is, when the low-cost narrow-band device is used, the nonlinear response characteristic exists, so that the influence of the nonlinear response characteristic occurs in addition to the intersymbol interference due to band limitation and wavelength dispersion accompanying the increase of the communication speed. Therefore, the conventional linear equalization and estimation method has a problem that it is difficult to obtain correct transmission data.

This problem will be specifically described with reference to FIGS. 18 and 19. FIG. 18 is a block diagram showing a conventional communication system 100 constituted by using the above-mentioned low-cost narrow-band device. The communication system 100 includes a signal generation device 4 on the transmission side, a transmission line 2, and an identification device 5z on the reception side.

The signal generating device 4 takes in an m-value data signal given from the outside and generates a transmission signal sequence $\{s_t\}$ of a digital electric signal. Where m is symbol multi-level degree and an integer equal to or larger than 2. Each symbol included in the transmission signal sequence $\{s_t\}$ is represented by a numeral or a symbol. For example, the PAM 8 is adopted, and in the case of m=8, each symbol is represented by a number of [0, 1, 2, 3, 4, 5, 6, 7]. t is an identification number for identifying each symbol included in the transmission signal sequence $\{s_t\}$, and indicates a relative time when each symbol is generated. For example, when the transmission signal sequence $\{s_t\}$ is transmitted in block units, and when the number of symbols of the transmission signal sequence $\{s_t\}$ included in one block is N, t=1, 2, . . . , N−1, N is satisfied.

In the transmission line 2, an intensity modulator 2-2 takes in the transmission signal sequence $\{s_t\}$ of the digital electric signal outputted from the signal generation device 4. The intensity modulator 2-2 modulates the intensity of light emitted from a light source 2-1 by the transmission signal sequence $\{s_t\}$ of the captured digital electric signal, and generates the transmission signal sequence $\{s_t\}$ of the optical signal. An optical fiber 2-3 transmits the transmission signal sequence $\{s_t\}$ of the optical signal generated by the intensity modulator 2-2. A light receiver 2-4 receives the transmission signal sequence $\{s_t\}$ of the optical signal transmitted by the optical fiber 2-3 as a reception signal sequence $\{r_t\}$ converts it into a reception signal sequence $\{r_t\}$ of an analogue electric signal by the direct detection system, and outputs it. The light receiver 2-4 is a photodiode, for example.

The identification device 5z is provided with a symbol determination device 90, performs preprocessing such as conversion of the reception signal sequence $\{r_t\}$ of the analogue electric signal outputted by the light receiver 2-4 to the reception signal sequence $\{r_t\}$ of the digital electric signal, and gives the reception signal sequence $\{r_t\}$ of the digital electric signal to the symbol determination device 90. The symbol determination device 90 determines a transmission symbol for the reception signal sequence $\{r_t\}$, and determines an estimated value of the transmission symbol (hereinafter, an estimated value of the transmission symbol is referred to an estimated transmission symbol so that an estimated value of the transmission symbol is indicated while distinguishing the estimated value of the transmission symbol from an original transmission symbol included in the transmission signal sequence $\{s_t\}$). The identification device 5z restores and outputs the m-value data signal from the estimated transmission symbol obtained by the symbol determination device 90.

In this case, the transmission line 2 is shown by an equalization circuit, and the configuration shown in FIG. 19 is obtained. In FIG. 19, it is assumed that intersymbol interference occurs up to a separated symbol by L symbols before and after the symbol at the time t in the transmission line 2, and L symbols before and after the symbol at the time t of the transmission signal sequence $\{s_t\}$ of the light shows a structure given to a transfer function unit 83.

A delay unit 81 takes in and stores the transmission symbol included in the transmission signal sequence $\{s_t\}$, and outputs the transmission symbol sored after the elapse time of "−LT". Since a minus sign is given to the delay amount, the delay unit 81 provides a negative delay of "LT". Here, "T" is a symbol interval, and the timing of calculation for each symbol is "tT".

Each of the delay units 82-1 to 82-2L take in and store the transmission symbol outputted by previous one of the delay unit connected with each other 81, 82-1 to 82-(2L−1), and outputs the stored transmission symbol after the elapse time of "T".

The transfer function unit 83 applies a transfer function (H) to the symbol sequence outputted by the delay units 81, 82-1 to 82-2L. An adder 85 adds cot which is a noise component to an output value of the transfer function unit 83 to generate the reception signal sequence $\{r_t\}$. $\omega_t$ is a Gaussian random sequence that is independent of each other of an average 0 and a variance $\delta^2$. The reception signal sequence $\{r_t\}$ generated by the equalizer circuit of FIG. 19 is represented by the following equation (1).

[Math. 1]

$$r_t = H(s_{t-L}, \ldots, s_t, \ldots, s_{t+L}) + \omega_t \quad (1)$$

As can be seen from the equation (1), if $\omega_t$ is removed and a correct transfer function (H) can be obtained in the symbol determination device 90, then a correct transmission signal sequence $\{s_t\}$ can be obtained by utilizing an inverse function of the transfer function (H).

However, when there are such problems as intersymbol interference and non-linear response as described above, it is difficult to obtain an accurate transfer function (H). As an effective equalization method for obtaining the correct transmission data from the reception signal waveform distorted by intersymbol interference or nonlinear response, for example, the equalization method of maximum likelihood sequential estimation (hereinafter, "MLSE"), is known (refer to NPL 1, 2).

The MLSE method will now be described briefly. The MLSE method is the method to estimate the maximum likelihood transmission symbol corresponding to the reception signal sequence $\{r_t\}$ by applying an estimated transfer function (called "an estimated transfer function (H')" below) to all of the transmission signal sequence $\{s_t\}$, and comparing the output sequence with the reception signal sequence $\{r_t\}$. However, when the sequence length N of the symbols of the transmission signal sequence $\{s_t\}$ and the reception signal sequence $\{r_t\}$ becomes large, the amount of calculation for comparison becomes large.

Therefore, in the MLSE method, comparison is performed by limiting the length of the sequence, that is, by searching for the transmission signal sequence $\{s'_t\}$, which maximizes a conditional joint probability density function $p_N(\{r_N\}|\{s'_N\})$ as shown by FIG. 2), a method of determining a transmission symbol is used.

[Math. 2]

$$p_N(\{r_N\}|\{s'_N\}) = \frac{1}{(2\pi\delta^2)^N} \exp\left[-\frac{1}{2\delta^2}\sum_{t=1}^{N}|r_t - H'(s'_{t-L}, \ldots, s'_t, \ldots, s'_{t+L})|^2\right] \quad (2)$$

The conditional joint probability density function $p_N(\{r_N\}|\{s'_N\})$ indicates the probability that the reception signal sequence $\{r_t\}$ is received when the transmission signal sequence $\{s'_t\}$ of sequence length N generated from m-value data is transmitted through the transmission line 2. As can be seen from the equation (2), the sequence length of the transmission signal sequence $\{s'_t\}$, which corresponds to one t, is not limited to "N", but limited to "2L+1".

Maximizing the conditional joint probability density function $p_N(\{r_H\}\{s'_N\})$ is equal to minimizing a distance function $d_N$ shown in the following equation (3). In the equation (3), the substitution of (p−1)/2=L is performed.

[Math. 3]

$$d_N = \sum_{t=1}^{N}|r_t - H'(s'_{t-(p-1)/2}, \ldots, s'_t, \ldots, s'_{t+(p-1)/2})|^2 \quad (3)$$

$(s'_{t-(p-1)/2}, \ldots, s'_t, \ldots, s'_{t+(p-1)/2})$ in equation (3) shows the state $\mu_t$ of the transmission line 2 at time t (referred to as "transmission line state $\mu_t$" below). When the sequence length is "p", the number of all combinations of the modulation symbol $I=[i_1, i_2, \ldots, i_m]$ is "$m^p$". In this case, the transmission line 2 can be regarded as a finite state machine having $m^p$ pieces of finite transmission line states. Since it can be regarded as the finite state machine, for example, a Viterbi algorithm or the like is used to calculate the distance function $d_H$ by performing sequential calculation for each of the reception signal sequences $\{r_t\}$.

At time t, the distance function $d_t(\{\mu_t\})$ reaching the transmission line state $\mu_t$ is expressed by the following equation (4) using the distance function $d_{t-1}(\{\mu_{t-1}\})$ at time t−1, the likelihood accompanying the state transition at the time t, that is, the metric $b(r_t; \mu_{t-1} \to \mu_t)$.

[Math. 4]

$$d_t(\{\mu_t\}) = d_{t-1}(\{\mu_{t-1}\}) + b(r_t; \mu_{t-1} \to \mu_t) \quad (4)$$

The metric $b(r_t; \mu_{t-1} \to \mu_t)$ is expressed using the estimated transfer function (H') as the following equation (5).

[Math. 5]

$$b(r_t; \mu_{t-1} \to \mu_t) = |r_t - H'(s'_{t-(p-1)/2}, \ldots, s'_t, \ldots, s'_{t+(p-1)/2})|^2 \quad (5)$$

The metric b at the time t depends only on the state transition from t−1 to t, and does not depend on the state transition before it. Here, it is assumed that the minimum value $d\_min_{t-1}(\mu_{t-1})$ reaching to the transmission line state $\mu_t$ and all state transition corresponding to this are known in all transmission line state $\mu_{t-1}$ at the time t−1.

When the minimum value of the distance function $d_t(\{\mu_t\})$ reaching the transmission line state $\mu_t$ is obtained under this assumption, it is not necessary to obtain the distance function $d_t(\{\mu_t\})$ corresponding to all state transitions. For all the transmission line states $\{\mu_{t-1}\}$ having a possibility of transiting to the transmission line state $\mu_t$, $d\_min_{t-1}(\mu_{t-1}) + b(r_t; \mu_{t-1} \to \mu_t)$ is calculated, and when a minimum value is obtained among them, that value is the minimum value $d\_min_t(\mu_t)$ which is the minimum value of all distance functions $d_t(\{\mu_t\})$ in which the value reaches the transmission line state $\mu_t$. This can be represented by the following equation (6).

[Math. 6]

$$d\_min_t(\mu_t) = \min_{\{\mu_{t-1}\} \to \mu_t} \{d\_min_{t-1}(\mu_{t-1}) + b(r_t; \mu_{t-1} \to \mu_t)\} \quad (6)$$

For example, when the minimum value of the distance function $d_t(\{\mu_t\})$ reaching the transmission line state $\mu_t$ is obtained by using a Viterbi algorithm or the like, the distance function $d_t(\{\mu_t\})$ corresponding to all the state transitions is not obtained but $d\_min_{t-1}(\mu_{t-1}) + b(r_t; \mu_{t-1} \to \mu_t)$ can be calculated for all transmission line states $\{\mu_{t-1}\}$ having the possibility of transiting to the transmission state $\mu_t$. Therefore, the calculation amount exponentially increasing with respect to the sequence length can be suppressed to linear increase.

For example, when an MLSE method is applied to the symbol determination device 90 of the communication system 100, the symbol determination device 90 estimates the estimated transfer function (H'), a symbol sequence of $(s'_{t-(p-1)/2}, \ldots, s't, \ldots, s'_{t+(p-1)/2})$ showing the transmission line state $\mu_t$ at the time t is applied to the estimated transfer function (H'). The symbol determination device 90 calculates metric $b(r_t; \mu_{t-1} \to \mu_t)$ from the above equation (5) based on the reception transmission sequence $\{r_t\}$, and $(s'_{t-(p-1)/2}, \ldots, s'_t, \ldots, s'_{t+(p-1)/2})$ to which the estimated transfer function (H') is applied.

The symbol determination device 90 calculates, for example, $d\_min_{t-1}(\mu_{t-1}) + b(r_t; \mu_{t-1} \to \mu_t)$ by a Viterbi algorithm according to the equation (6), the minimum value among the calculated values is $d\_min_t(\mu_t)$ which is the minimum value of the distance function $d_t(\{\mu_t\})$. The symbol determination device 90 identifies the estimated transmission symbol by tracing back a path of a trellis on the basis of the minimum value $d\_min_t(\mu_t)$ of the distance function $d_t(\{\mu_t\})$.

CITATION LIST

Non Patent Literature

[NPL 1] Hiroki Taniguchi and others, "255 Gb/s PAM-8 O-band transmission using MLSE based on nonlinear channel estimation with 20-Ghz bandwidth limitation", IEICE, OCS2019-18, (2019-06)

[NPL 2] Hiroki Taniguchi and others, "255 Gb/s PAM-8 O-band Transmission through 10-kmSMF using simplified MLSE based on Trellis-path Limitation", IEICE, OCS2019-65(2020-01)

SUMMARY OF INVENTION

Technical Problem

However, when the MLSE system is used, there is a problem that the amount of calculation increases exponentially with respect to the pulse spread width of the signal sequence in the transmission line 2. Although the MLSE system needs to estimate the response characteristics of the transmission line 2, when the direct detection system is used, there is a problem that the estimation error of the response characteristics becomes large due to nonlinearity of square-law detection. In order to solve these problems, in the technique described in NPL 1, the method that is called a non-linear maximum likelihood sequence estimation (it is called "NL-MLSE" (Non Linear-MLSE) below) is proposed.

FIG. 20 is a block diagram showing a configuration of a symbol determination device 90a of the NL MLSE system which is applied in place of the conventional symbol determination device 90 of the communication system 100 shown in FIG. 18.

The symbol determination device 90a includes a candidate symbol sequence generation unit 91, a replica generation filter unit 92, a subtractor 93, a metric calculation unit 94, a Viterbi decoding unit 95 and an update processing unit 96. The candidate symbol sequence generation unit 91 generates a candidate symbol sequence $\{s'_t\}$ indicating the state of the transmission line 2, that is, the symbol sequence $(s'_{t-(p-1)/2}, \ldots, s'_t, \ldots, s'_{t+(p-1)/2})$ of the "$m^p$" pieces of transmission line states $\mu_t$ as shown in the equation (3). The replica generation filter unit 92 includes, for example, a nonlinear filter such as a voltella filter. The replica generation filter unit 92 generates a replica of a reception signal sequence by applying a nonlinear filter to the candidate symbol sequence $\{s'_t\}$ outputted by the candidate symbol sequence generation unit 91.

The subtractor 93 takes in the reception signal sequence $\{r_t\}$ and the replica of the reception signal sequence generated by the replica generation filter unit 92, subtracts the replica of the reception signal sequence from the reception signal sequence $\{r_t\}$ to obtain a subtraction value, and outputs the obtained subtraction value. The metric calculation unit 94 squares the absolute value of the subtraction value output from the subtractor 93 to calculate the metric of the equation (5). The Viterbi decoding unit 95 identifies the estimated transmission symbol by applying the Viterbi algorithm to the metric calculated by the metric calculation unit 94.

The update processing unit 96 calculates the estimated transfer function (H'), based on the metric calculated by the metric calculation unit 94. The update processing unit 96 calculates tap gain values to be applied to taps of a nonlinear filter of the replica generation filter unit 92 on the basis of the calculated estimated transfer function (H'), respectively. For example, when the nonlinear filter is a volterra filter, each of the voltella nuclei in the volterra series becomes a tap. The update processing unit 96 applies the calculated tap gain values to the tap of the nonlinear filter of the replica generation filter unit 92 to update the tap gain values.

When a linear filter is applied as a filter of the replica generation filter unit 92, it is configured to perform the symbol determination by the conventional MLSE method. On the other hand, in the NL-MLSE method, a nonlinear filter is used as a filter of the replica generation filter unit 92. Therefore, the symbol determination device 90a can estimate a transfer function in which the influence of the nonlinear response of the transmission line 2 is taken into account. Thus, the symbol determination device 90a compares a replica of the reception signal sequence obtained by using the estimated transfer function (H') which considers the influence of the nonlinear response with the reception signal sequence $\{r_t\}$ and determines the transmission symbol, thereby the estimated transmission symbol with higher accuracy than that of the conventional MLSE method can be obtained.

However, in the NL-MLSE method, there is a problem that the amount of calculation is increased by applying a nonlinear filter to the replica generation filter unit 92.

In view of the above-mentioned circumstances, the present invention is an object of providing a technique capable of reducing the amount of calculation in maximum likelihood sequence estimation using a nonlinear filter.

Solution to Problem

A symbol determination device according to one embodiment of the present invention includes a candidate symbol sequence generation unit that generates a plurality of candidate symbol sequences that are candidates for a transmission symbol sequence, a transmission line estimation unit that has a nonlinear filter including a plurality of taps and generates a plurality of estimated reception symbol sequences on the basis of an estimated transfer function of the transmission line represented by a tap gain value applied to each tap and the plurality of candidate symbol sequences, a symbol determination unit that determines the transmission symbol by maximum likelihood sequence estimation based on a determination target reception symbol sequence obtained from the reception signal sequence and each of the plurality of estimated reception symbol sequences, and identifies the estimated transmission symbol corresponding to the determination target reception symbol sequence, an update processing unit that calculates new tap gain values based on the determination target reception symbol sequence and the estimated transmission symbol sequence identified by the symbol determination unit, and updates the estimated transfer function by applying the calculated new tap gain values to the tap of the transmission line estimation unit, and a tap selection unit that selects the tap to be used on the basis of the magnitude of the new tap gain values calculated by the update processing unit and a predetermined tap gain threshold value.

A tap selection method according to one aspect of the present invention includes, generating by the candidate symbol sequence generation unit the plurality of candidate symbol sequences to be candidates of the transmission symbol sequence, generating by the transmission line estimation unit having the nonlinear filter including the plurality of taps the plurality of estimated reception symbol sequences on the basis of an estimated transfer function of the transmission line represented by the tap gain value applied to each of the taps and the plurality of candidate symbol sequences, determining by the symbol determination unit the transmission symbol by the maximum likelihood sequence estimation on the basis of the determination target reception symbol sequence obtained from the reception signal sequence and each of the plurality of estimated reception symbol sequences and identifying the estimated transmission symbol corresponding to the determination target reception symbol sequence, calculating by the update processing unit the new tap gain values on the basis of the determination target reception symbol sequence and the estimated transmission symbol sequence identified by the symbol determination unit and updating the estimated transfer function by applying the calculated new tap gain values to the tap of the transmission line estimation unit, and selecting by the tap selection unit the tap to be used on the basis of the magnitude of the new tap gain values calculated by the update processing unit and the predetermined tap gain threshold value.

Advantageous Effects of Invention

According to the present invention, it is possible to reduce the amount of calculation in maximum likelihood sequence estimation using the nonlinear filter.

DESCRIPTION OF EMBODIMENTS

First Embodiment

Figure 1:
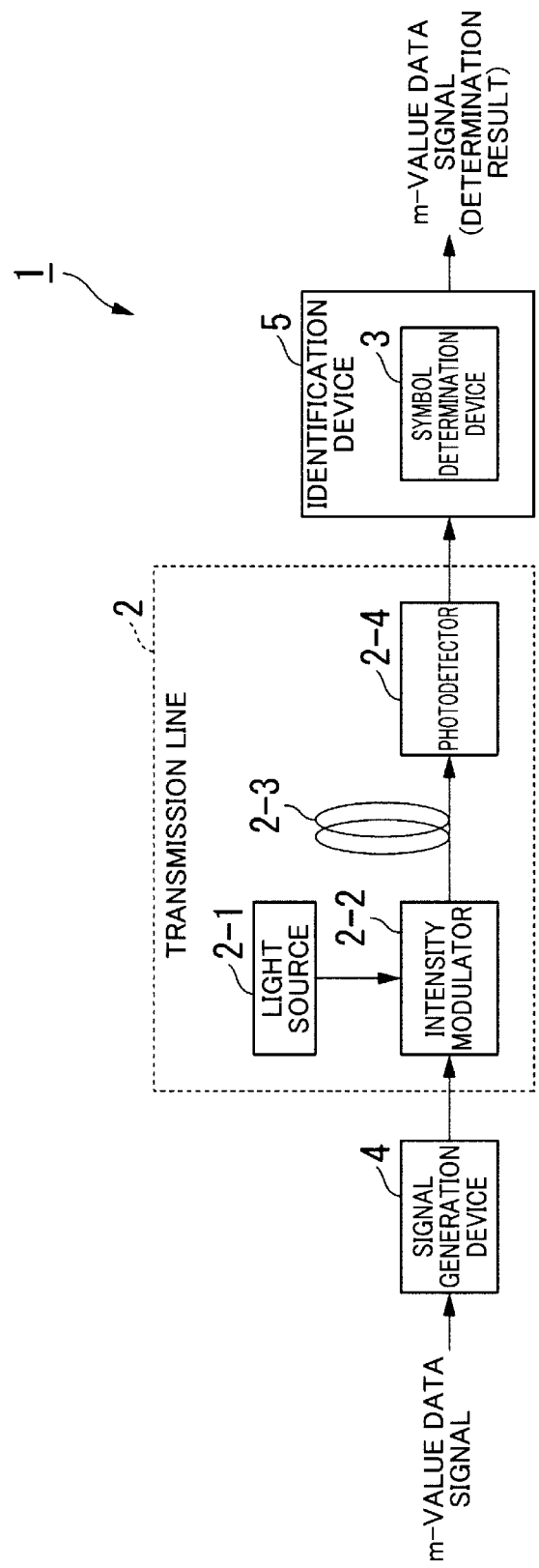
FIG. 1 is a block diagram illustrating a configuration of a communication system according to a first embodiment.
Figure 2:
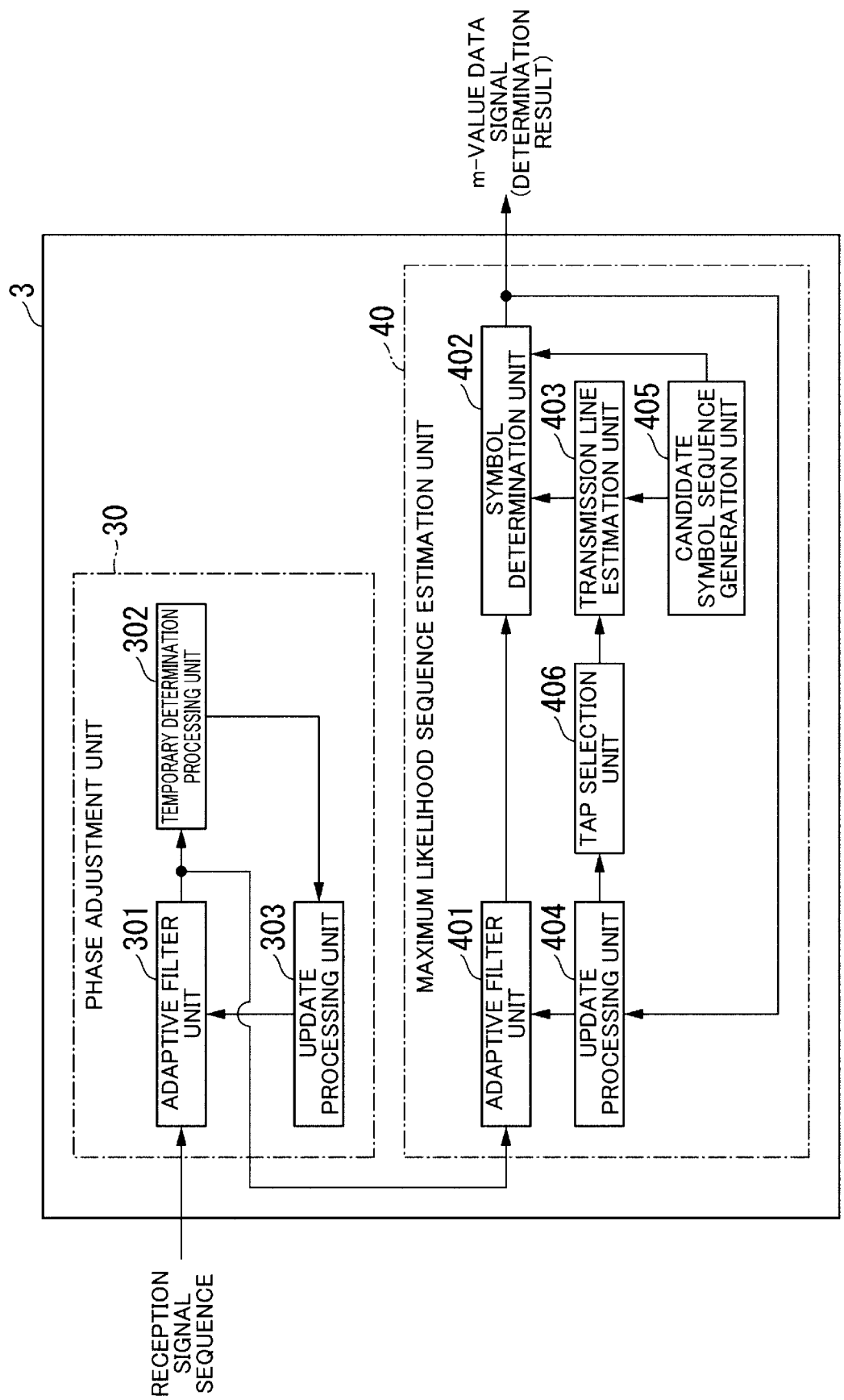
FIG. 2 is a block diagram illustrating an internal configuration of a symbol determination device according to the first embodiment.
Figure 18:
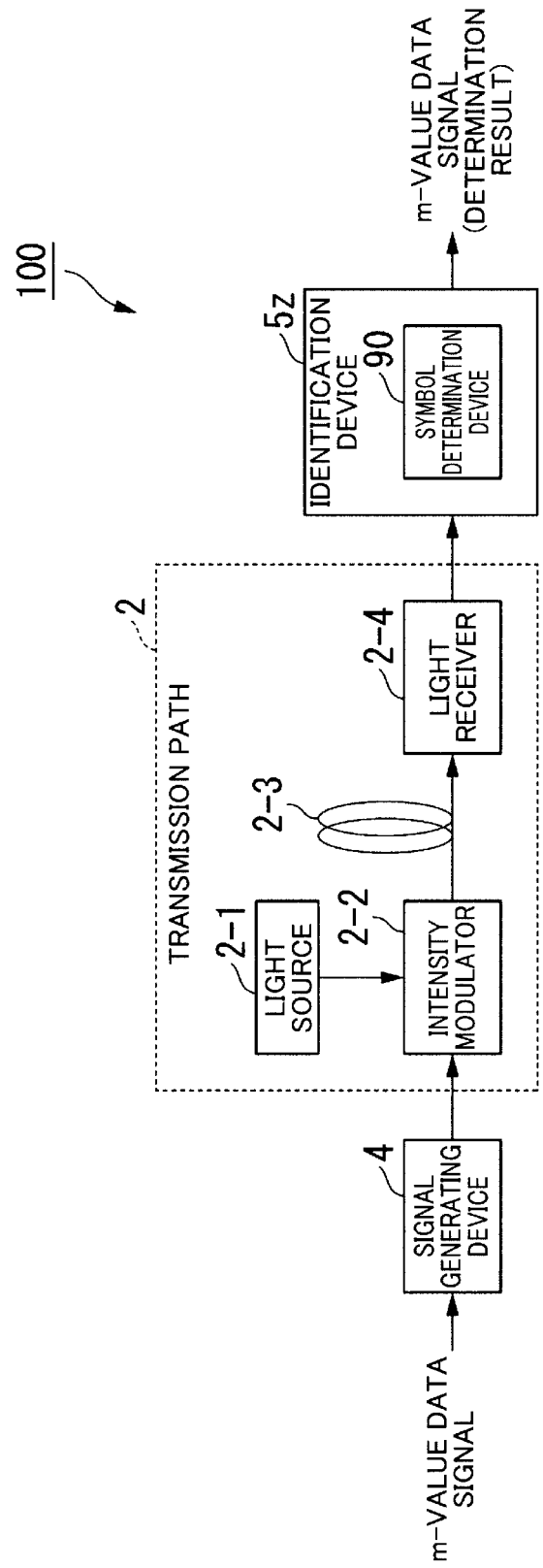
FIG. 18 is a block diagram illustrating a configuration of a conventional communication system.
Figure 19:
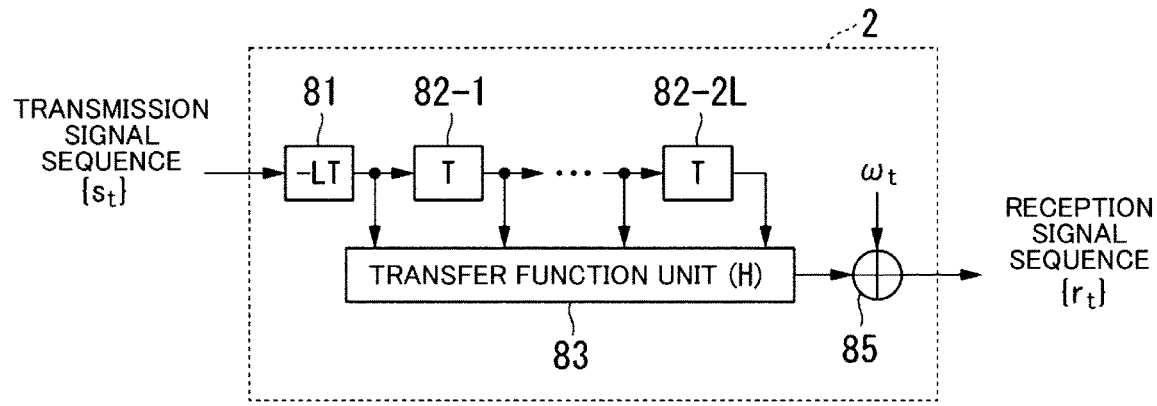
FIG. 19 is a block diagram of an equalization circuit of the transmission line.

Hereinafter, an embodiment of the present invention will be described with reference to the drawings. FIG. 1 is a block diagram illustrating a configuration of a communication system 1 according to a first embodiment. The communication system 1 includes a signal generation device 4, a transmission line 2, and an identification device 5. The signal generation device 4 and the transmission line 2 have the same configuration as the signal generation device 4 and the transmission line 2 included in the conventional communication system 100 shown in FIG. 18.

The identification device 5 is provided with the symbol determination device 3, performs preprocessing such as converting a reception signal sequence $\{r_t\}$ of an analogue electric signal outputted by the light receiver 24 into a reception signal sequence $\{r_t\}$ of a digital electric signal, and gives the reception signal sequence $\{r_t\}$ of the digital electric signal to the symbol determination device 3. The identification device 5 restores and outputs an m-value data signal from an estimated transmission symbol identified by the symbol determination device 3.

The symbol determination device 3 determines the transmission symbol for the reception signal sequence $\{r_t\}$ of the digital electric signal and identifies the estimated transmission symbol corresponding to the reception signal sequence $\{r_t\}$. The symbol determination device 3 includes a phase adjustment unit (phase adjuster) 30 and a maximum likelihood sequence estimation unit 40. The phase adjustment unit 30 is, for example, an FFE (Fed Forward Equalizer), and outputs the reception signal sequence $\{r_t\}$ of the digital electric signal while aligning the phase thereof with the sampling phase.

The maximum likelihood sequence estimation unit 40 generates the estimated reception symbol sequence by applying an estimated transfer function (H') to a candidate symbol sequence $\{s'_t\}$ which is a transmission signal sequence $\{s_t\}$ obtained by limiting a sequence length of a symbol. The maximum likelihood sequence estimation unit 40 determines the transmission symbol by maximum likelihood sequence estimation on the basis of a determination target reception symbol sequence obtained from the reception signal sequence $\{r_t\}$ and each of the generated estimated reception symbol sequences, and identifies the estimated transmission symbol corresponding to the determination target reception symbol sequence.

Figure 3:
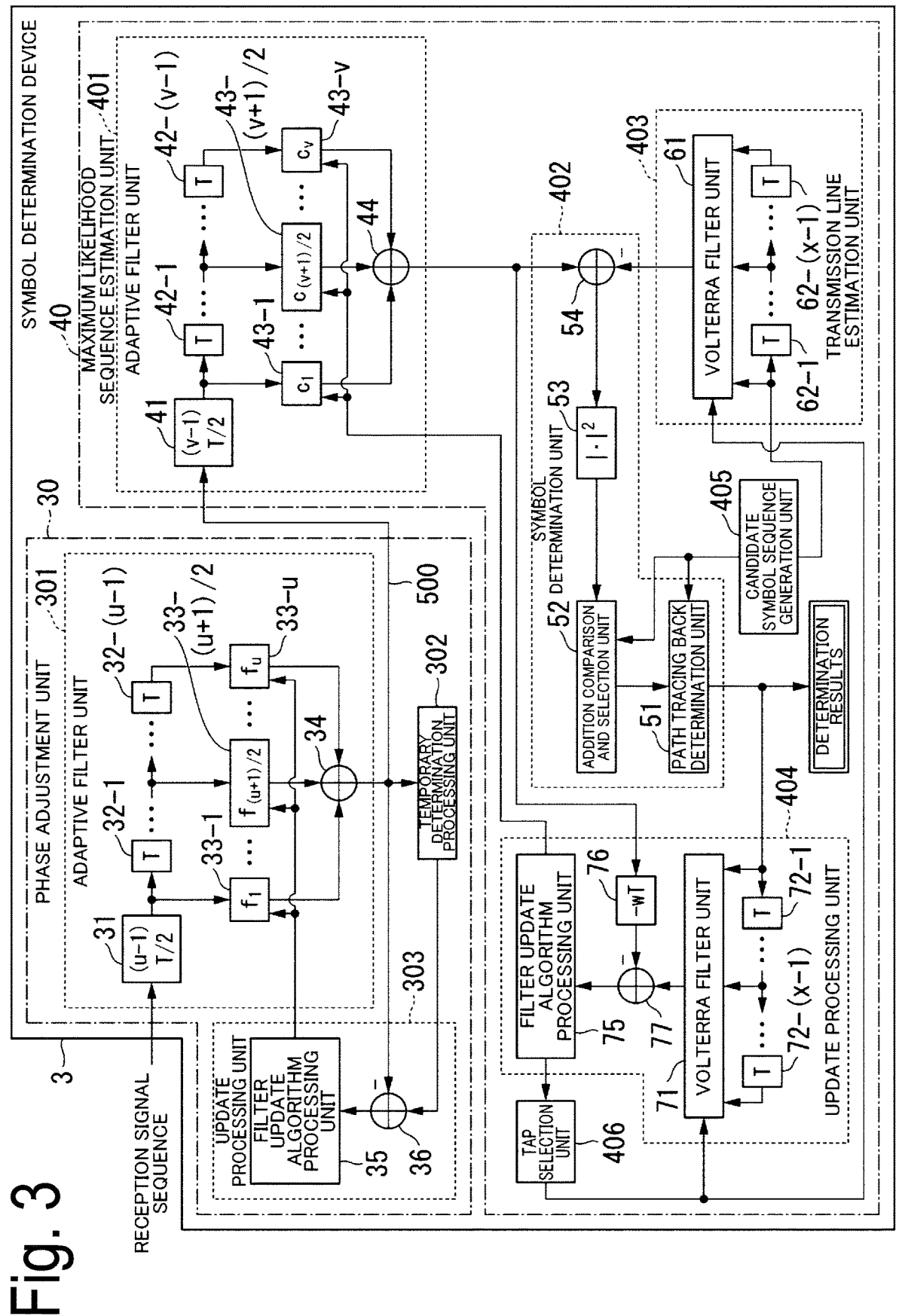
FIG. 3 is a block diagram illustrating a detailed configuration of an inside of the symbol determination device according to the first embodiment.

The phase adjustment unit 30 includes an adaptive filter unit (adaptive filter) 301, a temporary determination processing unit (temporary determination processor) 302, and an update processing unit (update processor) 303. The adaptive filter unit 301 is, for example, a linear transversal filter as shown in FIG. 3. The adaptive filter unit 301 adaptively equalizes a reception signal sequence $\{r_t\}$ which is an input signal by an estimated inverse transfer function obtained by estimating the inverse transfer function of the transfer function (H) of the transmission line 2.

Figure 4:
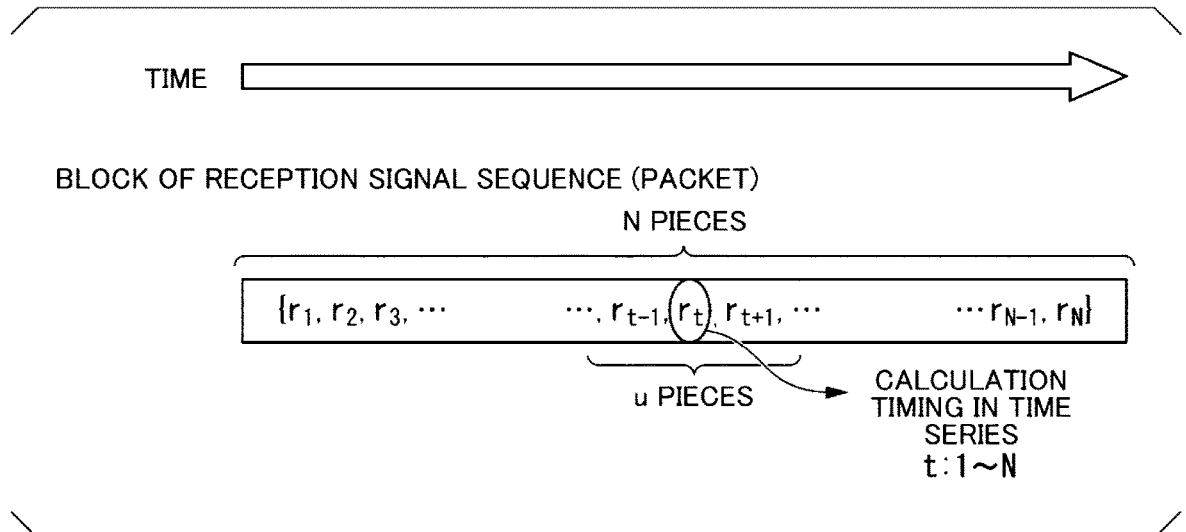
FIG. 4 is a diagram for describing a sequence in which a phase adjustment unit takes according to the first embodiment.

As shown in FIG. 3, the adaptive filter unit 301 includes delay units 31, 32-1 to 32-($u$−1), taps 33-1 to 33-$u$, and an adder 34. As shown in FIG. 4, the delay unit 31 takes in u pieces of symbol sequences centered on a symbol at time t, which is a part of the reception signal sequence $\{r_t\}$ of the sequence length N. The delay unit 31 outputs, from among the u pieces of symbol that is taken in, sequences a symbol $r_{t-(u-1)/2}$ which is "(u−1) T/2" time before the time t, that is, the preceding symbol by "(u−1)/2" pieces of symbols than the symbol at the time t. Therefore, the tap 33-1 is supplied with the $r_{t-(u-1)/2}$ outputted from the delay unit 31.

Each of the delay units 32-1, 32-2 to 32-($u$−1) outputs a symbol which is one symbol behind the symbol outputted by previous one of the delay units 31, 32-1 to 32-($u$−2), which are connected to each. For example, the first delay unit 32-1 outputs, from among the u pieces of symbol sequences, the symbol which is "(u−3) T/2" time before the time t, that is, the symbol of $r_{t-(u-3)/2}$ which is "(u−3)/2" pieces of symbols before the symbol at the time t. The last delay unit 32-($u$−1) outputs, from among the u pieces of symbol sequences, the symbol of $r_{t+(u-1)/2}$ which is "(u−1) T/2" time before the time t, that is, the symbol of "(u−1)/2" which is "(u−1)/2" pieces of symbols after the symbol at the time t. As a result, a signal including a symbol sequence having a sequence length u shown by the following equation (7) is supplied to the taps 33-1 to 33-$u$.

[Math. 7]

$$r_{t-(u-1)/2}, \ldots, r_t, \ldots, r_{t+(u-1)/2} \qquad (7)$$

The tap gain value of $f_1, f_2, \ldots, f_{(u+1)/2}, \ldots, f_u$, that is so called filter coefficient value, is set to each of the tap 33-1 to tap 33-$u$. These tap gain values $f_1$ to $f_u$ represents the estimated inverse transfer function. The taps 33-1 to 33-$u$ multiplies each symbol to be given by each tap gain values $f_1$ to $f_u$ and output. The adder 34 sums the output values of the taps 33-1 to 33-$u$ and outputs the sum. Since the equation (7) can be a sequence centered on the $r_t$ of the time t, which is the "(u+1)/2"-th element, the output value of the adder 34 can be expressed as the following equation (8).

[Math. 8]

$$\mathrm{Out}_{filter\_u} = \sum_{j=1}^{u} f_j r_{t - \frac{u+1}{2} + j} \qquad (8)$$

The temporary determination processing unit 302 performs temporary determination of the transmission symbol by hard decision with respect to an output value of the adaptive filter unit 301, and outputs the temporary determined transmission symbol (it is called "temporary determination symbol" below) as the result of the temporary determination.

The update processing unit 303 calculates an update values of tap gain values $f_1$ to $f_u$ of each tap 33-1 to 33-$u$ of the adaptive filter unit 301, with a target value of an output value of the adaptive filter unit 301 as a temporary determination symbol outputted by the temporary determination processing unit 302. For example, the update processing unit 303 calculates an update value of the tap gain values $f_1$ to $f_u$, that is, the estimated inverse transfer function by a predetermined update algorithm.

As shown in FIG. 3, the update processing unit 303 includes a filter update algorithm processing unit 35 and a subtractor 36. In an update processing unit 303, the subtractor 36 outputs a subtraction value obtained by subtracting an output value of the adaptive filter unit 301 from a temporary determination symbol outputted by the temporary determination processing unit 302 to the filter update algorithm processing unit 35 as an error.

The filter update algorithm processing unit 35 calculates the update value of the tap gain values $f_1$ to $f_u$ by a predetermined update algorithm so as to reduce the error outputted by the subtractor 36. The filter update algorithm processing unit 35 sets the calculated tap gain values $f_1$ to $f_u$ to the taps 33-1 to 33-$u$, and updates the tap gain values $f_1$ to $f_u$.

Figure 5:
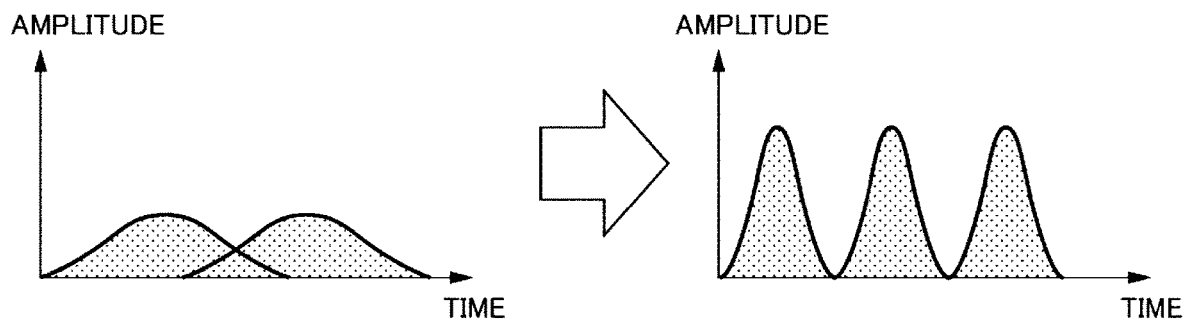
FIG. 5 is a diagram illustrating an overview of a compression of a pulse width according to the first embodiment.

The maximum likelihood sequence estimation unit 40 includes an adaptive filter unit (high-frequency component suppression filter) 401, a symbol determination unit (symbol determiner) 402, a transmission line estimation unit 403, an update processing unit (update processor) 404, a candidate symbol sequence generation unit (candidate symbol sequence generator) 405 and a tap selection unit (tap selector) 406. The adaptive filter unit 401 is, for example, a linear transversal filter as shown in FIG. 3, and compresses the impulse response of the reception signal sequence $\{r_t\}$ in order to reduce the storage length of the transmission line estimation unit (transmission line estimator) 403. Here, the compression of the impulse response is to compress the pulse width of the signal sequence spread over time due to band limitation and wavelength dispersion, as shown in FIG. 5, and interference between symbols can be reduced by the compression.

As shown in FIG. 3, the adaptive filter unit 401 includes a delay units 41, 42-1 to 42-($v$−1), taps 43-1 to 43-$v$, and an adder 44. Similarly to the delay unit 31, the delay unit 41 takes in $v$ pieces of symbol sequences centered on the symbol at the time t, which is a part of the output signal sequence (the output of the adaptive filter unit 301 of the phase adjustment unit 30 is represented as $\{r'_t\}$ below) of the adaptive filter unit 301 of the phase adjustment unit in the manner shown in FIG. 4.

The delay unit 41 outputs, among $v$ pieces of symbol sequences which are taken in, a symbol $r'_{t-(v-1)/2}$ which is "($v$−1) T/2" time before the time t, that is, the preceding symbol by "($v$−1)/2" pieces of symbols than the symbol at the time t. Therefore, the tap 43-1 is supplied with $r'_{t-(v-1)/2}$ outputted by the delay unit 41.

Each of the delay units 42-1, 42-1 to 42-($v$−1) outputs a symbol which is one symbol behind the symbol outputted by previous one of the delay units 41, 42-1 to 42-($v$−2) which are connected to each other. For example, the first delay unit 42-1 outputs, from among the u pieces of symbol sequences, the symbol of $r'_{t-(v-3)/2}$ which is "($v$−3) T/2" time before the time t, that is, "($v$−3)/2" pieces of symbols before the symbol at the time t. The last delay unit 42-($v$−1) outputs, from among the $v$ pieces of symbol sequences, the symbol of $r'_{t+(v-1)/2}$ which is "($v$−1) T/2" time before the time t, that is, the symbol of $r'_{t+(v-1)/2}$ which is "($v$−1)/2" pieces of symbols after the symbol at the time t. As a result, a signal including a symbol sequence of sequence length V shown by the following equation (9) is supplied to the taps 43-1 to 43-$v$.

[Math. 9]

$$r'_{t-(v-1)/2}, \ldots, r'_t, \ldots, r'_{t+(v-1)/2} \tag{9}$$

The tap gain values of $c_1, c_2, \ldots, c_{(v+1)/2}, \ldots, c_v$, it is called as the filter coefficient value, to each tap 43-1 to 43-$v$. The taps 43-1 to 43-$v$ multiplies each symbol to be given by each tap gain value and outputs. The adder 44 sums the output values of the taps 43-1 to 43-$v$ and outputs the sum. Since the equation (9) can be a sequence centered on the $r'_t$ at the time t which is the "($v$+1)/2"-th element, the expression of the output of the adder 44 is the following equation (10).

[Math. 10]

$$\text{Out}_{filter\_v} = \sum_{j=1}^{v} c_j r'_{t-\frac{v+1}{2}+j} \tag{10}$$

As can be seen from the equation (10), the adaptive filter 401 outputs one output symbol obtained by compressing the amount of information of the symbol sequence for $v$ pieces, although the influence degree is adjusted by the tap gain values $c_1, c_2, \ldots, c_{(v+1)/2}, \ldots c_v$. Although it is known that the calculation amount of the MLSE increases exponentially with respect to the spread width of the pulse, an increase in the calculation amount can be suppressed by compressing the pulse width by the adaptive filter unit 401. The adaptive filter unit 401 outputs a sequence of output values of the adder 44 as the determination target reception symbol sequence.

Figure 20:
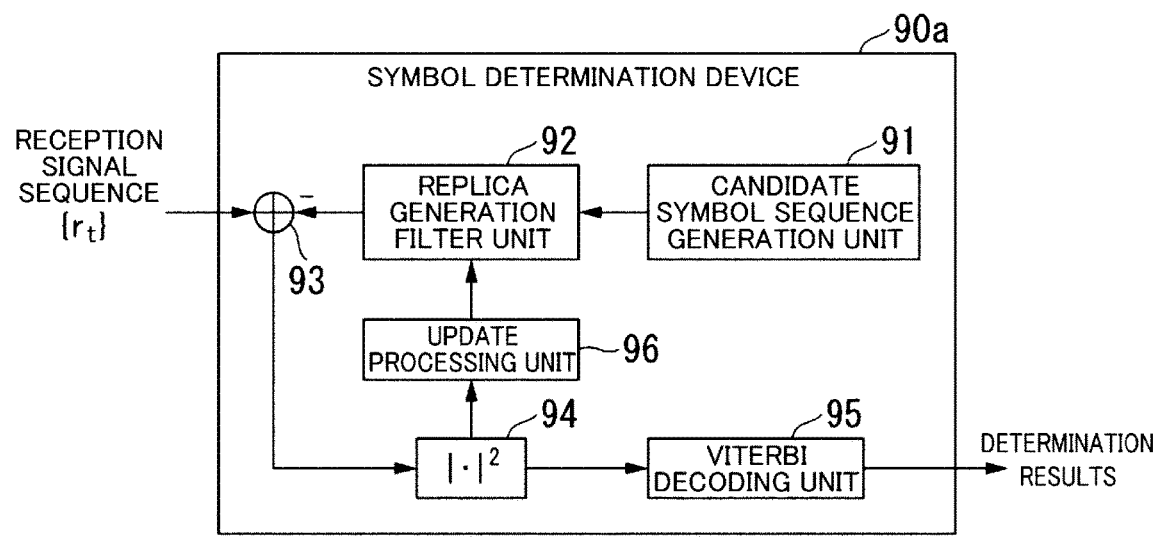
FIG. 20 is a block diagram illustrating an internal configuration of the symbol determination device corresponding to the technique disclosed in NPL 1.

The candidate symbol sequence generating unit 405 has the same configuration as the candidate symbol sequence generating unit 91 shown in FIG. 20, and generates the candidate symbol sequence $\{s'_t\}$ which is the transmission signal sequence $\{s_t\}$ having a limited sequence length of symbols. The candidate symbol sequence $\{s'_t\}$ is the symbol sequence $(s'_{t-(p-1)/2}, \ldots, s'_t, \ldots, s'_{t+(p-1)/2})$ of "$m^p$" pieces of the transmission line states $\mu_t$ shown in the equation (3). For example, it is assumed that a PAM4 is adopted, m=4 is satisfied, and each symbol is represented by a number of [0, 1, 2, 3]. If it is assumed that the sequence length p=3 is satisfied, the candidate symbol sequence generation unit 405 generates 43 pieces of [0, 0, 0], [0, 0, 1] to [2, 2, 3], [2, 3, 0] to [3, 3, 3], that is, 64 pieces of candidate symbol sequences $\{s'_t\}$. The candidate symbol sequence generation unit 405 outputs the generated candidate symbol sequence $\{s'_t\}$ every sequence to the volterra filter unit 61, the addition comparison and selection unit 52, and the path tracing back determination unit 51.

The transmission line estimation unit 403 generates a plurality of estimated reception symbol sequences by applying the estimated transfer function (H') represented by the tap gain value of the tap provided in a volterra filter which is a nonlinear filter to each of a plurality of candidate symbol sequences $\{s'_t\}$ d outputted by the candidate symbol sequence generation unit 405.

As shown in FIG. 3, the transmission line estimation unit 403 includes a volterra filter unit 61 constituting a voltella filter, and the delay units 62-1 to 62-($x$−1). The delay unit 62-1 delays the symbol included in the candidate symbol sequence $\{s'_t\}$ outputted by the candidate symbol sequence generating unit 405 by one symbol and outputs the delayed symbol. The delay unit 62-2 to 62-(x−1) output the symbol which is one symbol behind the symbol outputted by previous one of the delay unit 62-1 to 62-(x−2) which are connected each other. Here, x is the storage length of the volterra filter unit 61, which coincides with the sequence length P of the candidate symbol sequence {s'$_t$} generated by the candidate symbol sequence generation unit 405. The candidate symbol sequence {s'$_t$} generated by the candidate symbol sequence generation unit 405, that is, (s'$_{t−(p−1)/2}$, . . . , s'$_t$, . . . , s'$_{t+(p−1)/2}$), by represented using x, is the following equation (11).

[Math. 11]

$$s'_{t-(x-1)/2}, \ldots, s'_t, \ldots, s'_{t+(x-1)/2} \quad (11)$$

The candidate symbol sequence {s'$_t$}, which is represented by the equation (11), given to the volterra filter unit 61. The volterra filter unit 61 is a volterra filter for performing calculation by the third-order volterra series of the following equation (12), for example.

[Math. 12]

$$H'(S'_t) = \sum_{i=1}^{x} h_i s'_{t-(x+1)/2+i} + \sum_{i=1}^{x}\sum_{j=1}^{x} h_{jk} s'_{t-(x+1)/2+i} s'_{t-(x+1)/2+j} + \sum_{i=1}^{x}\sum_{j=1}^{x}\sum_{k=1}^{x} h_{ijk} s'_{t-(x+1)/2+i} s'_{t-(x+1)/2+j} s'_{t-(x+1)/2+k} \quad (12)$$

The "S't", which is an input element of the estimated transfer function (H') of the equation (12), as shown in equation (13), is generated by combining symbols included in the candidate symbol sequence {s'$_t$} given to the volterra filter unit 61 shown by the equation (11).

[Math. 13]

$$S'_t = \begin{pmatrix} s'_{t-(x-1)/2}, \ldots, s'_t, \ldots, s'_{t+(x-1)/2}, \\ s'_{t-(x-1)/2} s'_{t-(x-1)/2}, \ldots, \\ s'_t s'_t, \ldots, \\ s'_{t+(x-1)/2} s'_{t+(x-1)/2}, \\ s'_{t-(x-1)/2} s'_{t-(x-1)/2} s'_{t-(x-1)/2}, \ldots, \\ s'_t s'_t s'_t, \ldots, \\ s'_{t+(x-1)/2} s'_{t+(x-1)/2} s'_{t+(x-1)/2} \end{pmatrix} \quad (13)$$

Volterra nuclei shown in equation (12) $h_1, h_2, \ldots h_x, h_{11}, h_{12}, \ldots, h_{xx}, h_{111}, h_{112}, \ldots, h_{xxx}$ is the filter coefficient vale of the volterra filter, and this filter coefficient value becomes the coefficient value of the estimated transfer function (H'). Volterra nuclei $h_1, h_2, \ldots, h_x, h_{11}, h_{12}, \ldots, h_{xx}, h_{111}, h_{112}, \ldots, h_{xxx}$ is set to a plurality of taps of the volterra filter unit 61 by the update processing unit 404.

For example, when the storage length of the Volterra filter unit 61 is x=5, that is, the sequence length of the candidate symbol sequence {s'$_t$} is p=5, the volterra filter unit 61 is provided with $5^3$=125 taps when simply calculated as the third-order number of taps. However, in the case where five sequences are, for example, {s'$_{t−2}$, s'$_{t−1}$, s'$_t$, s'$_{t+1}$, s'$_{t+2}$} the values of [s'$_{t−1}$×s'$_t$×s'$_{t+1}$], [s'$_{t−1}$×s'$_{t+1}$×s'$_t$], [s'$_t$×s'$_{t+1}$×s'$_{t−1}$], [s'$_t$×s'$_{t−1}$×s'$_{t+1}$], [s'$_{t+1}$×s'$_t$×s'$_{t−1}$], and [s'$_{t+1}$×s'$_{t−1}$×s'$_t$] are the same.

Therefore, it is not necessary to allocate six taps to these six patterns, and it is sufficient to allocate one tap and multiply the value by six. Therefore, the number of taps of each order of the volterra filter unit 61 is obtained by the following equation (14), where the input sequence length is P and the volterra order is i. Therefore, in the case of the sequence quantity p=5, the number of third-order taps is not 125 pieces, but 35 pieces.

[Math. 14]

$$_{p+i-1}C_i \quad (14)$$

A volterra filter unit 61 generates the estimated reception symbol sequence in which an estimated transfer function (H') is applied to the candidate symbol sequence {s'$_t$} by filtering the candidate symbol sequence {s'$_t$}, and outputs the generated estimated reception symbol sequence.

The symbol determination unit 402 calculates the metric between the determination target reception symbol sequence outputted by the adaptive filter unit 401 and each of the estimated reception symbol sequences outputted by the transmission line estimation unit 403 for each candidate symbol sequence {s'$_t$}. The symbol determination unit 402 determines the transmission symbol by the maximum likelihood sequence estimation on the basis of the calculated metric, and identifies the estimated transmission symbol corresponding to the determination target reception symbol sequence.

As shown in FIG. 3, the symbol determination unit 402 includes a subtractor 54, a metric calculation unit 53, an addition comparison and selection unit 52, and a path tracing back determination unit 51. The subtractor 54 calculates a subtraction value obtained by subtracting each of a plurality of estimated reception symbol sequences outputted by the transmission line estimation unit 403 shown by the equation (12) from the determination target reception symbol sequence that is a sequence of output values of the adaptive filter unit 401 shown by the equation (10). Since the number of the subtraction values calculated by the subtractor 54 matches the number of the candidate symbol sequences {s'$_t$} d generated by the candidate symbol sequence generation unit 405, and the subtraction values becomes $m^p$ pieces (=$m^x$).

The metric calculation unit 53 perform a calculation shown in equation (15), that is, which calculates a plurality of metrics by squaring each absolute value of a plurality of subtraction values outputted by the subtractor 54.

$$b(r_t; \mu_{t-1} \to \mu_t) = \left| \sum_{j=1}^{v} c_j r'_{t-\frac{v+1}{2}+j} - H'(S'_t) \right|^2 \quad (15)$$

The addition comparison and selection unit 52 performs the method described with reference to the above-mentioned equations (4) to (6), for example, by the Viterbi algorithm. That is, the addition comparison and selection unit 52 calculates the distance function $d_t(\{\mu_t\})$ corresponding to each of the plurality of metrics based on the candidate symbol sequence {s'$_t$} outputted by the candidate symbol sequence generation unit 405 and the plurality of metrics outputted by the metric calculation unit 53. The addition comparison selection unit 52 detects the minimum value $d\_min_t(\{\mu_t\})$ of the calculated distance function $d_t(\{\mu_t\})$.

The path tracing back determination unit 51 generates the trellis path on the basis of the candidate symbol sequence {s'$_t$} outputted by the candidate symbol sequence generation unit 405 and the minimum value $d\_min_t(\{\mu_t\})$ of the calculated distance function $d_t(\{\mu_t\})$ detected by the addition comparison and selection unit 52. The path tracing back determination unit 51 traces back the generated trellis path and identifies the estimated transmission symbol corresponding to the determination target reception symbol sequence. The number "w" of tracing back when the path tracing back determination unit 51 traces back the path is predetermined, and the amount of calculation required for determining the tracing back path can be reduced by setting the number "w" of tracing back to a fixed value. It is known that the path converges by tracing back several times of the storage length x of the transmission line estimation unit 403.

Hereinafter, the estimated transmission symbol corresponding to the time t identified by tracing back the trellis path of the path tracing back determination unit 51 is referred to as an estimated transmission symbol at. The path tracing back determination unit 51 outputs the estimated transmission symbol at as a determination result.

The update processing unit 404 calculates the new tap gain values to be applied to the taps 43-1 to 43-$v$ of the adaptive filter unit 401 and the new tap gain values of the tap included in the volterra filter unit 61 of the transmission line estimation unit 403 on the basis of the determination target reception symbol sequence outputted by the adaptive filter unit 401 and a sequence of the estimated transmission symbol at outputted as the determination result by the symbol determination unit 402. Then update processing unit 404 updates the tap gain values by applying the calculated new tap gain values to the taps 43-1 to 43-$v$ and the taps provided in the volterra filter unit 61.

The update processing unit 404 includes a volterra filter unit 71, delay units 72-1 to 72-$(x-1)$, a filter update algorithm processing unit 75, a delay unit 76, and a subtractor 77. The volterra filter unit 71 has the same configuration as the volterra filter unit 61 of the transmission line estimation unit 403. The delay units 72-1 to 72-$(x-1)$ have the same configuration as the delay units 62-1 to 62-$(x-1)$ of the transmission line estimation unit 403. The estimated transmission symbol at outputted from the path tracing back determination unit 51 is given to the delay unit 72-1. Therefore, $(a_{t-(x-1)/2}, \ldots, a_t, \ldots, a_{t+(x-1)/2})$ which is the sequence of the estimated transmission symbol at is given to the volterra filter unit 71, and the volterra filter unit 71 performs the calculation shown by the following equation (16).

[Math. 16]

$$H'(A_t) = \sum_{i=1}^{x} h_i a_{t-(x+1)/2+i} + \sum_{i=1}^{x}\sum_{j=1}^{x} h_{jk} a_{t-(x+1)/2+i} a_{t-(x+1)/2+j} + \sum_{i=1}^{x}\sum_{j=1}^{x}\sum_{k=1}^{x} h_{ijk} a_{t-(x+1)/2+i} a_{t-(x+1)/2+j} a_{t-(x+1)/2+k} \quad (16)$$

The "$A_t$" which is the input element of the estimated transfer function (H') of the equation (16) is generated by combining symbols included in the sequence of $(a_{t-(x-1)/2}, \ldots, a_t, \ldots, a_{t+(x-1)/2})$ which is given to the volterra filter 71 as shown by the following equation (17).

[Math. 17]

$$A_t = \begin{pmatrix} a_{t-(x-1)/2}, \ldots, a_t, \ldots, a_{t+(x-1)/2}, \\ a_{t-(x-1)/2} a_{t-(x-1)/2}, \ldots, \\ a_t a_t, \ldots, \\ a_{t+(x-1)/2} a_{t+(x-1)/2}, \\ a_{t-(x-1)/2} a_{t-(x-1)/2} a_{t-(x-1)/2}, \ldots, \\ a_t a_t a_t, \ldots, \\ a_{t+(x-1)/2} a_{t+(x-1)/2} a_{t+(x-1)/2} \end{pmatrix} \quad (17)$$

The delay unit 76 delays the output value outputted from the adaptive filter unit 401 by the time of "−wT", that is, the symbol of "−w", and outputs the delayed value to the subtractor 77. The estimated transmission symbol at corresponding to the time t outputted by the path tracing back determination unit 51 is outputted after the elapse time of wT from the time t by processing performed by the path tracing back determination unit 51. Therefore, the estimated transmission symbol at corresponding to the time t is obtained at the time t+wT. In order to use the output value outputted by the adaptive filter unit 401 as a target value to be used for filter update, it is necessary to match the time of the output value with the time of the estimated transmission symbol at. Therefore, not an output value outputted by the adaptive filter unit 401 at the time point of time t+wT, but a output value outputted by the adaptive filter unit 401 is given at the time point t which is delayed by the time of "−wT" by the delay unit 76 is given to the subtractor 77.

The subtractor 77 subtracts the output value of the delay unit 76 from the output value of the volterra filter unit 71, and outputs an error obtained by the subtraction to the filter update algorithm processing unit 75.

The filter update algorithm processing unit 75 calculates the update value of the tap gain values $c_1$ to $c_v$ by the predetermined update algorithm so as to reduce the error on the basis of the error output by the subtractor 77. The filter update algorithm processing unit 75 sets the calculated tap gain values $c_1$ to $c_v$ to the taps 43-1 to 43-$v$, and updates the tap gain values $c_1$ to $c_v$.

The filter update algorithm processing unit 75 calculates the update value of the tap gain value corresponding to each of the plurality of taps included in the volterra filter unit 61 and 71 by the predetermined update algorithm so as to reduce the error on the basis of the error output by the subtractor 36. The filter update algorithm processing unit 75 outputs the update values of the tap gain value corresponding to each of the plurality of taps of the volterra filter units 61, 71 to the tap selection unit 406.

The tap selection unit 406 selects the tap to be used among the plurality of taps of the volterra filter units 61, 71 on the basis of the tap gain value corresponding to each of the plurality of taps of the volterra filter units 61, 71 outputted by the filter update algorithm processing unit 75 and the predetermined tap gain threshold value.

For example, the tap selection unit 406 rewrites the tap gain value whose absolute value of the tap gain value is equal to or less than the tap gain threshold value to "0", and then writes the updated values of the tap gain value to the taps of the volterra filter unit 61, 71 to update the taps. When "0" are set as the tap gain values, the taps of the volterra filter unit 61, 71 are configured not to perform calculation processing, and are selected as the taps to be used by the taps to which the value other than "0" are set as the tap gain values.

Processing in the Phase Adjustment Unit According to the First Embodiment

Figure 6:
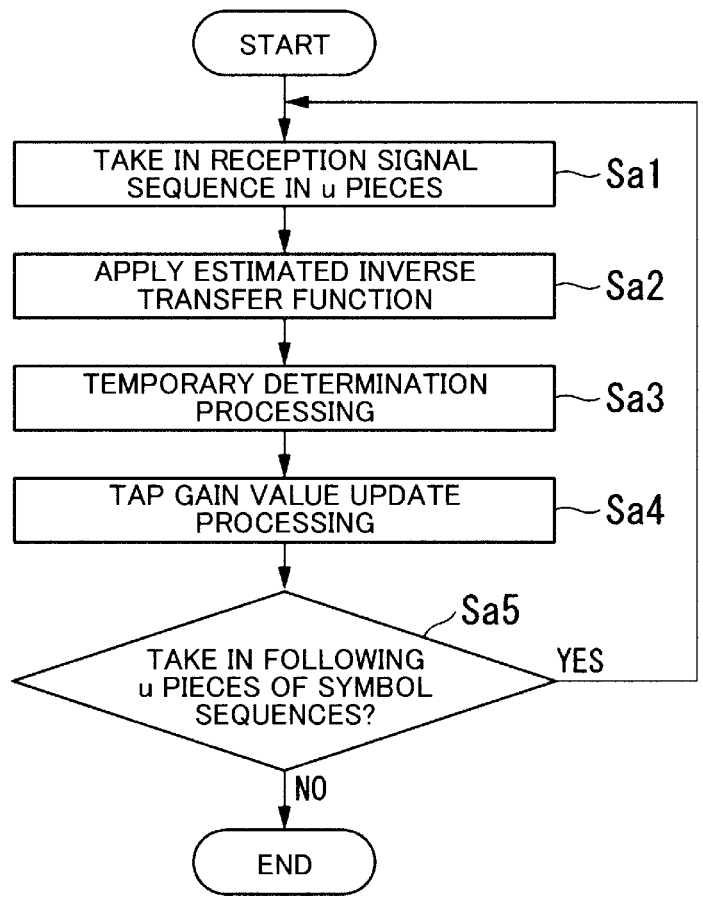
FIG. 6 is a flowchart illustrating a flow of processing of the phase adjustment unit of the symbol determination device according to the first embodiment.

FIG. 6 is a flowchart illustrating a processing flow of the phase adjustment unit 30 of the symbol determination device 3. The delay unit 31 of the adaptive filter unit 301 takes in the symbol sequence of the sequence length u from the reception signal sequence $\{r_t\}$ (a step Sa1). The delay unit 31 delays the taken in symbol sequence by the time "(u−1)T/2" and outputs the delayed symbol sequence. Each of the delay units 32-1 to 32-(u−1), which are connected to each other, takes in and stores the symbol outputted by previous one of the preceding delay units 31-1, 32-1 to 32-(u−2), and outputs the stored symbol after the elapse time of "T".

Thus, the symbol sequence of the reception signal sequence $\{r_t\}$, in which the sequence length shown by the equation (7) is limited to u pieces, is given to the taps 33-1 to 33-u. The taps 33-1 to 33-u multiply the symbol $r_{t-(u-1)/2}$ to $r_{t+(u-1)/2}$ given to each by the tap gain values $f_1$ to $f_u$ set to each, and apply the estimated inverse transfer function to the symbol $r_{t-(u-1)/2}$ to $r_{t+(u-1)/2}$.

The taps 33-1 to 33-u output the multiplied results to the adder 34. The adder 34 sums the multiplied results to calculate an output value represented by the equation (8) and outputs the output value to the temporary determination processing unit 302, the subtractor 36, and the adaptive filter unit 401 of the maximum likelihood sequence estimation unit 40. The signal sequence of the outputted values is the output signal sequence $\{r'_t\}$ (a step Sa2).

The temporary determination processing unit 302 performs temporary determination of the transmission symbol by the hard decision with respect to the output value of the adaptive filter unit 301, and outputs the temporary determination symbol as the temporary determination result (a step Sa3).

The subtractor 36 outputs a subtraction value obtained by subtracting the output value of the adaptive filter unit 301 from the temporary determination symbol outputted by the temporary determination processing unit 302 to the filter update algorithm processing unit 35 as the error. The filter update algorithm processing unit 35 calculates the update value of the tap gain values $f_1$ to $f_u$, that is, the estimated inverse transfer function, so as to reduce the error on the basis of the error outputted by the subtractor 36. The filter update algorithm processing unit 35 writes the calculated tap gain values $f_1$ to $f_u$ in the taps 33-1 to 33-u, and updates the tap gain value $f_1$ to $f_u$ (a step Sa4).

When the delay unit 31 of the adaptive filter unit 301 can take in the symbol sequence of the sequence length u obtained by shifting the symbol sequence of the sequence length u taken in at the previous step Sa1 by one symbol from the reception signal sequence $\{r_t\}$ (a step Sa5, yes), processing of the step Sa1 is performed. On the other hand, when the delay unit 31 cannot take in the symbol sequence of the sequence length u obtained by shifting the symbol sequence of the sequence length u taken in at the previous step Sa1 by one symbol from the reception signal sequence $\{r_t\}$ (the step Sa5, No), processing is finished.

Figure 7:
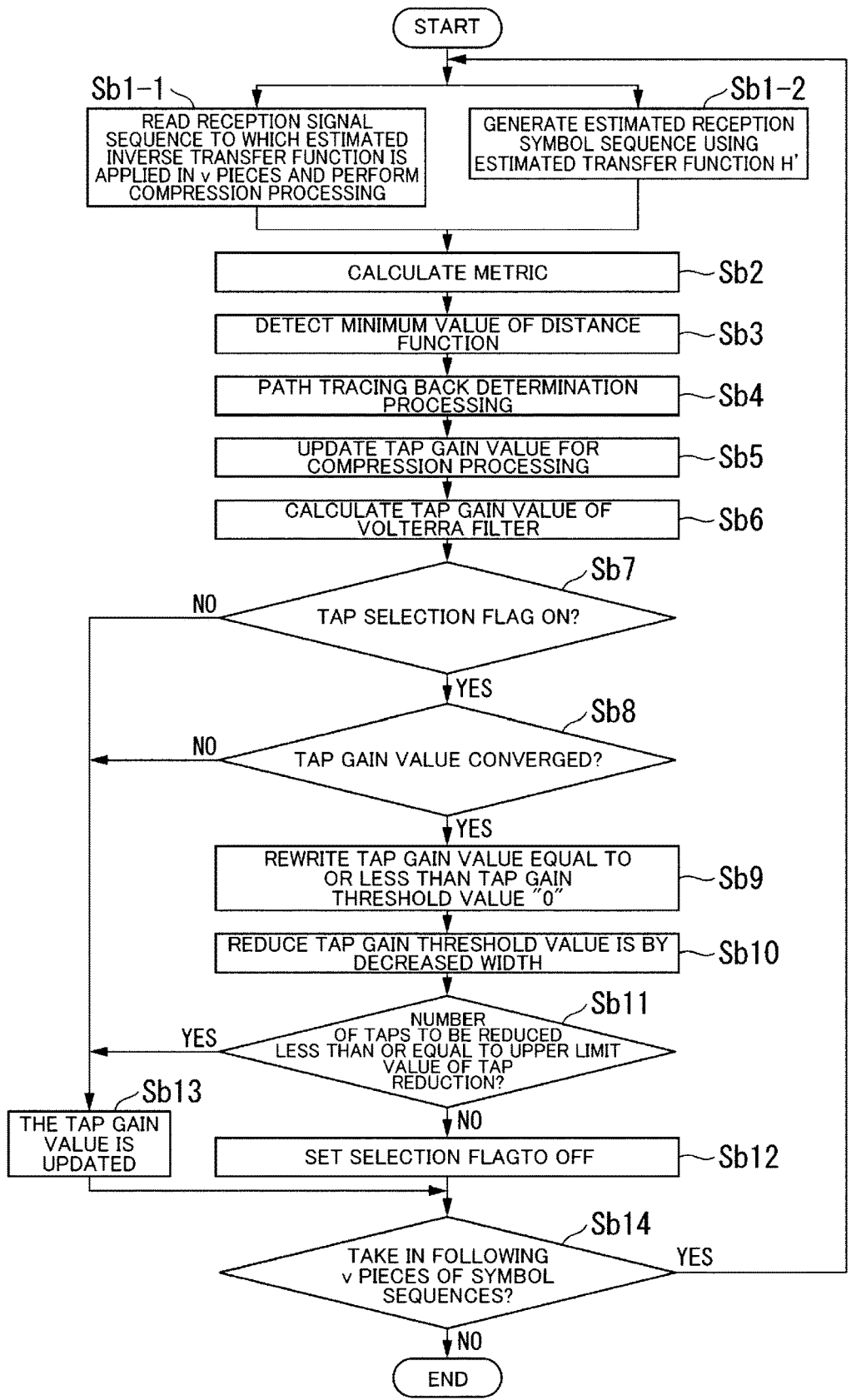
FIG. 7 is a flowchart illustrating a flow of processing of a maximum likelihood sequence estimation unit according to the first embodiment.

Processing in the Maximum Likelihood Sequence Estimation Unit According to the First Embodiment FIG. 7 is a flowchart illustrating a processing flow of the maximum likelihood sequence estimation unit 40 of the symbol determination device 3. As preprocessing for performing the processing of the flowchart shown in FIG. 7, a user of the symbol determination device 3 connects a management terminal device to the symbol determination device 3, operates the management terminal device, "ON" is written in the area of a tap selection flag which is provided in the storage area inside the tap selection unit 406 and indicates whether or not tap selection processing is to be performed.

The user of the symbol determination device 3 operates the terminal device for management to write an initial value of the tap gain threshold value appropriately determined in a tap gain threshold value area provided in the storage area inside the tap selection unit 406.

The user of the symbol determination device 3 operates the terminal device for management to write a suitably determined value in an area of a convergence determination value used for determining whether or not the tap gain value provided in the storage area inside the tap selection unit 406.

The user of the symbol determination device 3 operates the terminal device for management to write a value appropriately determined in an area of the reduction width of the tap gain threshold value provided in the storage area inside the tap selection unit 406.

The user of the symbol determination device 3 operates the terminal device for management to write a suitably determined value in an area of a tap reduction upper limit value indicating an upper limit value of the number of taps to be reduced provided in the storage area inside the tap selection unit 406.

The delay unit 41 of the adaptive filter unit 401 takes in the symbol sequence of sequence length v from the output signal sequence $\{r'_t\}$ which is the sequence of output values outputted by the adder 34 of the adaptive filter unit 301 of the phase adjustment unit 30. The delay unit 41 delays the taken in symbol sequence by the time of "(v−1)T/2" and outputs the delayed symbol sequence. Each of the delay units 42-1 to 42-(u−1), which are connected to each other, takes in and stores the symbol outputted by previous one of the preceding delay unit 41, 42-1 to 42-(u−2), and outputs the stored symbol after the elapse of "T".

As a result, the symbol sequence of the reception signal sequence $\{r'_t\}$ shown in the equation (9) is given to the taps 43-1 to 43-v. The taps 43-1 to 43-v multiply the symbol $r'_{t-(v-1)/2}$ to $r'_{t+(v-1)/2}$ given to each by the tap gain values $c_1$ to $c_v$ set to each, and output the multiplied result to the adder 44. The adder 44 sums the multiplied results to calculate the output value represented by the equation (10). The adder 44 outputs the determination target reception symbol sequence which is the sequence of the calculated output values to the subtractor 54 of the symbol determination unit 402 (a step Sb1-1).

In parallel with the processing of the step Sb1-1, the candidate symbol sequence generation unit 405 generates a plurality of candidate symbol sequences $\{s'_t\}$, outputs the generated plurality of candidate symbol sequences $\{s'_t\}$ every sequence to the volterra filter unit 61, the addition comparison and selection unit 52, and the path tracing back determination unit 51.

The delay unit 62-1 of the transmission line estimation unit 403 takes in the candidate symbol sequence $\{s'_t\}$ outputted by the candidate symbol sequence generation unit 405. The delay unit 62-1 delays the symbol included in the taken in candidate symbol sequence $\{s'_t\}$ by one symbol and outputs the delayed symbol. The delay units 62-2 to 62-(x−1) output a symbol which is one symbol behind the symbol outputted by previous one of the delay units 62-1 to 62-(x−2), which are connected each other. As a result, the candidate symbol sequence $\{s'_t\}$ shown by the equation (11) is given to the volterra filter unit 61.

The volterra filter unit 61 generates an input element "$S'_t$," shown by the equation (13) from each of the plurality of given candidate symbol sequences $\{s'_t\}$. The volterra filter unit 61 performs the calculation shown by the equation (12) and generates the estimated reception symbol sequence for each of the plurality of candidate symbol sequences $\{s'_t\}$ on the basis of the generated input element "$S'_t$," the volterra nuclei $h_1, h_2, \ldots, h_x, h_{11}, h_{12}, \ldots, h_{xx}, h_{111}, h_{112}, \ldots h_{xxx}$ set to each of the inside taps. The volterra filter unit 61 outputs a plurality of generated estimated reception symbol sequences to the subtractor 54 of the symbol determination unit 402 (a step Sb1-2).

The subtractor 54 calculates the subtraction value obtained by subtracting each of a plurality of estimated reception symbol sequences outputted by the voltella filter unit 61 of the transmission line estimation unit 403 from the determination target reception symbol sequence that is a sequence of output values outputted by the adder 44 of the adaptive filter unit 401. The metric calculation unit 53 perform the calculation shown in the equation (15), that is, which calculates a plurality of metrics by squaring the absolute value of each of a plurality of subtraction values outputted by the subtractor 54 (a step Sb2).

The addition comparison and selection unit 52 calculates the distance function $d_t(\{\mu_t\})$ corresponding to each of the plurality of metrics based on the candidate symbol sequence $\{s'_t\}$ outputted by the candidate symbol sequence generation unit 405 and the plurality of metrics outputted by the metric calculation unit 53. The addition comparison and selection unit 52 detects the minimum value $d\_min_t(\{\mu_t\})$ of the calculated distance function $d_t(\{\mu_t\})$ (a step Sb3).

The path tracing back determination unit 51 generates the trellis path based on the candidate symbol sequence $\{s'_t\}$ outputted by the candidate symbol sequence generation unit 405 and the minimum value $d\_min_t(\{\mu_t\})$ of the distance function $d_t(\{\mu_t\})$ detected by the addition comparison and selection unit 52. The path tracing back determination unit 51 traces back the generated trellis path and identifies the estimated transmission symbol at corresponding to the determination target reception symbol sequence (a step Sb4).

The delay unit 72-1 of the update processing unit 404 takes in the estimated transmission symbols at sequentially outputted by the path tracing back determination unit 51. The delay unit 72-1 delays the estimated transmission symbols at sequentially taken in by one symbol and outputs the delayed transmission symbols. The delay unit 72-2 to 72-($x$−1) outputs the symbol which is one symbol behind the symbol outputted by previous one of the delay unit 72-1 to 72-($x$−2), which are connected each other. As a result, the sequence called $(a_{t-(x-1)/2}, \ldots, a_t, \ldots, a_{t+(x-1)/2})$ is given to the volterra filter unit 71.

The volterra filter unit 71 generates the input element "$A_t$," shown by the equation (17) from $(a_{t-(x-1)/2}, \ldots, a_t, \ldots, a_{t+(x-1)/2})$ which is given. At this point of time, the same volterra nuclei as the volterra nuclei $h_1, h_2, \ldots, h_x, h_{11}, h_{12}, \ldots, h_{xx} h_{111}, h_{112}, \ldots h_{xxx}$ set to the taps of the volterra filter unit 61 is set to the taps of the volterra filter unit 71. Therefore, the volterra filter unit 71 performs the calculation shown in the equation (16) and outputs the output value gained by the calculation to the subtractor 77 based on the generated input element "S' t" and the volterra nuclei $h_1, h_2, \ldots, h_x, h_{11}, h_{12}, \ldots h_{xx}, h_{111}, h_{112}, \ldots, h_{xxx}$.

The delay unit 76 delays the output value outputted from the adaptive filter unit 401 by the time of "−wT", that is, the symbol of "−w", and outputs the delayed value to the subtractor 77. The subtractor 77 subtracts the output value outputted from the delay unit 76 from the output value of the volterra filter unit 71, and outputs the error obtained by the subtraction to the filter update algorithm processing unit 75.

The filter update algorithm processing unit 75 calculates the update values of the tap gain values $c_1$ to $c_v$ by a predetermined update algorithm so as to reduce the error on the basis of the error outputted by the subtractor 77. The filter update algorithm processing unit 75 sets the calculated tap gain values $c_1$ to $c_v$ to the taps 43-1 to 43-$v$ corresponding to each tap, and updates the tap gain values $c_1$ and $c_v$ (a step Sb5).

The filter update algorithm processing unit 75 calculates the update values of the tap gain value corresponding to each of a plurality of taps included in the volterra filter units 61 and 71 by the predetermined update algorithm so as to reduce the error on the basis of the error outputted by the subtractor 36. The filter update algorithm processing unit 75 outputs the updated value of the tap gain values corresponding to each of the plurality of taps of the volterra filter units 61 to 71 to the tap selection unit 406 (a step Sb6).

The tap selection unit 406 takes in the update values of the plurality of tap gain values outputted by the filter update algorithm processing unit 75. The tap selection unit 406 refers to the internal storage area, and determines whether or not a tap selection flag is "ON" (a step Sb7). When it is determined that the tap selection flag is not "on" (the step Sb7, No), the tap selection unit 406 proceeds a step to a step SB13.

On the other hand, when the tap selection flag is determined to be "on" (the step Sb7, Yes), the tap selection unit 406 reads the updated value of the tap gain value immediately before from the internal storage area. The tap selection unit 406 compares each of the updated values of the read tap gain values of the preceding tap gain values with each of the update values of the taken in tap gain values, and determines whether or not the tap gain values converge (a step Sb8).

For example, the tap selection unit 406 calculates a square error between each of the update values of the preceding tap gain values and each of the update values of the taken in tap gain values corresponding to each of the update values of the preceding tap gain values. The tap selection unit 406 calculates a total error value by summing the calculated square error, and determines that the calculated total error value is converged when the calculated total error value is equal to or less than a convergence determination value stored in the internal storage area.

When the tap selection unit 406 determines that convergence has not been achieved (the step Sb8, No), processing proceeds to a step Sb13. On the other hand, when it is determined that the tap gain value is converged (the step Sb8, Yes), the tap selection unit 406 reads the tap gain threshold value from the internal storage area, and rewrites the update values of the tap gain value not more than the tap gain threshold value to "0" among the update values of the taken in tap gain values (a step Sb9).

The tap selection unit 406 reads the reduction width of the tap gain threshold value from the internal storage area, subtracts the value corresponding to the reduction width of the tap gain threshold value from the tap gain threshold value, and overwrites the new tap gain threshold value obtained by the subtraction in the area of the tap gain threshold value of the internal storage area (a step Sb10).

The tap selection unit 406 counts the number of taps whose tap gain values are "0". The tap selection unit 406 reads the tap reduction upper limit value from the internal storage area, and determines whether the counted number is equal to or less than the tap reduction upper limit value or not (a step Sb11).

When it is determined that the number of taps whose counted tap gain values are "0" is equal to or less than the tap reduction upper limit value (the step Sb11, Yes), the tap selection unit 406 proceeds processing to a step Sb13. On the other hand, when it is determined that the number of taps whose counted tap gain values are "0" is not equal to or less than the tap reduction upper limit value (the step Sb11, No), the tap selection unit 406 rewrites the tap selection flag of the internal storage area to "OFF", and proceeds the processing to a step Sb14.

The tap selection unit 406, in the processing of the step Sb13, deletes all the tap gain values preceding by one from the internal storage area in the processing of the step Sb13, and writes the update values of the plurality of tap gain values at that time point in the internal storage area as the tap gain value preceding by one. The tap selection unit 406 writes the update values of the plurality of tap gain values at that point of time to the taps of the volterra filter units 61, 71 corresponding to each of the update value to update the tap gain values (a step Sb13).

The update values of the plurality of tap gain values at that point of time are the update values of the plurality of tap gain values taken in at the step Sb7 when the processing of the step Sb13 is performed after "No" is determined in the determination processing of the step Sb7 and the step Sb8. On the other hand, when the processing of the step Sb13 is performed after the determination of "Yes" is performed in the determination processing of the step Sb11, the update value of the plurality of tap gain values in which the update values of the tap gain value equal to or less than the tap gain threshold value is rewritten to "0" by the processing of the step Sb9 becomes the update value of the plurality of the tap gain values at that point of the time.

When the delay unite 41 of the adaptive filter unit 401 takes in the symbol sequence of the sequence length v obtained by shifting the symbol sequence of the sequence length v taken in at the previous step Sb1-1 by one symbol from the output signal sequence $\{r'_t\}$ outputted by the adaptive filter unit 301 of the phase adjustment unit 30 (a step Sb14, Yes), processing of steps Sb1-1 is performed. On the other hand, when the delay unit 41 cannot take in the symbol sequence of the sequence length v obtained by shifting the symbol sequence of the sequence length v taken in at the previous step Sb1-1 by one symbol from the output signal sequence $\{r'_t\}$ outputted by the adaptive filter unit 301 of the phase adjustment unit 30 (a step Sb14, No), the steps are terminated.

Note that, in the process shown in FIG. 7, the processing of the step Sb5 may be performed after the processing of the step Sb6 to the step Sb13, that is, immediately before step Sb14.

In the symbol determination device 3 according to the first embodiment, the candidate symbol sequence generation unit 405 generates the plurality of candidate symbol sequences that are candidates for the transmission symbol sequence. The transmission line estimation unit 403 has the nonlinear filter including the plurality of taps, and generates the plurality of estimated reception symbol sequences on the basis of the estimated transfer function of the transmission line represented by the tap gain value applied to each tap and the candidate symbol sequence. The symbol determination unit 402 determines the transmission symbol by the maximum likelihood sequence estimation on the basis of the determination target reception symbol sequence obtained from the reception signal sequence and each of the plurality of estimated reception symbol sequences, and identifies the estimated transmission symbol corresponding to the determination target reception symbol sequence. The update processing unit 404 calculates the new tap gain values on the basis of the determination target reception symbol sequence and the sequence of the estimated transmission symbols identified by the symbol determination unit 402, and updates the estimated transfer function by applying the calculated new tap gain values to the tap of the transmission line estimation unit 403. The tap selection unit 406 selects a tap to be used on the basis of the magnitude of the new tap gain values calculated by the update processing unit 404 and the predetermined tap gain threshold value.

The tap having a small tap gain value has a small influence on the filter output, and even if the tap having a small tap gain value is reduced, the performance does not deteriorate significantly. Then, the tap selection unit 406 in the symbol determination device 3, as shown by the processing indicated in the step Sb9, rewrites the update values of the tap gain value equal to or less than the tap gain threshold value to "0" among update values of tap gain value calculated by the filter update algorithm processing unit 75, then writes the update values of the tap gain value to the taps of the volterra filter units 61, 71. As a result, the taps whose tap gain values are "0" in the volterra filter units 61, 71 are not calculated. Since the volterra filter unit 61 repeatedly performs an calculation for generating the estimated reception symbol sequence for each candidate symbol sequence $\{s'_t\}$, it becomes possible to reduce the calculation amount on the maximum likelihood sequence estimation using nonlinear filters by reducing the number of taps to be calculated and remaining the taps having the larger influence of representing the estimated transfer function (H').

It is to be noted that the nonlinear filter other than the volterra filter may be applied instead of the volterra filter units 61, 71, or a linear filter may be applied. However, when the linear filter is applied, the number of taps can be reduced as in the configuration of the first embodiment, when comparing the number of taps of the linear filter with the number of taps of the nonlinear filter such as the volterra filter, the number of taps of the nonlinear filter which can be reduced is significantly larger, and the number of taps of the nonlinear filter is reduced, so that the amount of calculation can be greatly reduced.

The tap selection unit 406 repeatedly reduces the number of taps while decreasing the tap gain threshold value little by little as in the processing shown in the step Sb10. In this way, the tap gain threshold value is gradually reduced, so that the number of taps to be reduced at a time is reduced, and performance deterioration due to the reduction of the taps is made gentle. Therefore, it is possible to optimize the tap gain values of the tap which are finally used for the calculation, that is, which remains without being reduced. In the processing of the step Sb10, although the reduction width of the tap gain threshold value is set to a constant amount, the reduction width of a plurality of tap gain thresholds value is set, and the decrease width may be increased at first and the decrease width may be decreased as the number of times of repetition of the step Sb10 increases.

In the first embodiment, as shown in step Sb11, when the number of taps to be reduced exceeds a tap reduction upper limit value, the tap selection unit 406 sets the tap selection flag to "OFF" so that the tap reduction processing is automatically stopped. This processing is performed because the processing for selecting the tap to be used may be performed once before the actual operation is performed. When the tap gain value converges at a value exceeding the tap gain threshold value before the number of taps to be reduced exceeds the tap reduction upper limit value, the user of the symbol determination device 3 connect terminal device for management to the symbol determination device 3, operates the terminal device for management, rewrite the tap selection flag to "OFF", thereby it is possible to terminate forcibly the processing of the tap reduction and transfer to the operation state. In this case, since it is considered that the tap reduction upper limit value is not appropriate, when processing for periodically making the number of taps an optimum state is performed, as described later, it is desirable to change the tap reduction upper limit value to an appropriate value as the tap reduction processing is automatically terminated.

When the configuration is changed by exchanging the optical fiber 23 of the transmission line 2 after the operation is started, a user of the symbol determination device 3 connects a terminal device for management to the symbol determination device 3, operates the terminal device for management, By rewriting the tap selection flag to "on", the tap reduction processing is performed again, and the number of taps can be set to an optimum state. The tap selection unit 406 may be provided with a timer, and periodically rewrites the tap selection flag from "off" to "on" to perform tap reduction processing.

In the first embodiment described above, the phase adjustment unit 30 is provided in the preceding stage of the maximum likelihood sequence estimation unit 40, and the maximum likelihood sequence estimation unit 40 is provided with the adaptive filter unit 401. However, the present invention is not limited to these embodiments. If the sampling phase of the reception signal sequence $\{r_t\}$ is aligned, the estimated transmission symbol can be identified by the maximum likelihood sequence estimation performed by the symbol determination unit 402 even if the reception signal sequence $\{r_t\}$ taken in by the adaptive filter unit 301 of the phase adjustment unit 30 is directly given to the subtractor 54 of the symbol determination unit 402 and the delay unit 76 of the update processing unit 404 without providing the phase adjustment unit 30 and the adaptive filter unit 401.

However, in reality, there is a case where the sampling phases of the reception signal sequence $\{r_t\}$ are not aligned, and when the phase condition of the reception signal sequence $\{r_t\}$ is not constant, the volterra filter unit 61, 71 are affected by the phase condition of the reception signal sequence $\{r_t\}$, and it becomes difficult for the tap selection unit 406 to fix the tap to be reduced.

By providing the phase adjustment unit 30, the update processing unit 303 of the phase adjustment unit 30 calculates the error between the temporary determination symbol outputted by the temporary determination processing unit 302 and the output value of the adaptive filter unit 301, and updates the estimated inverse transfer function to be applied to the adaptive filter unit 301 so as to reduce the least square error. Thus, the phase of the output signal sequence outputted by the adaptive filter unit 301 to which the updated and converged estimated reverse transfer function is applied coincides with the phase of the sequence of the transmission symbol obtained by the temporary determination, and the sampling phases of the output signal sequence are aligned. The output signal sequence outputted from the adaptive filter unit 301 to which the updated and converged estimated reverse transfer function is applied can suppress ripples due to reflection or the like of the transmission line 2.

However, since the adaptive filter 301 of the phase adjustment unit 30 amplifies the high frequency component lowered by the transmission line 2, the high frequency component of the white noise is also amplified. In order to suppress the high frequency components of the white noise, the first embodiment is provided with the adaptive filter unit 401. The tap gain values of the adaptive filter unit 401 $c_1$, $c_2$, ..., $c_{(v+1)/2}$, ..., $c_v$ are updated by the update processing unit 404 at the same timing as the estimated transfer function (H') applied to the transmission line estimation unit 403. Therefore, by applying the adaptive filter unit 401 to the output signal sequence $\{r'_t\}$ of the adaptive filter unit 301, the high frequency component of the white noise amplified by the adaptive filter unit 301 can be suppressed.

In the configuration of the first embodiment, the adaptive filter unit 401 performs the process of compressing the pulse width in addition to the process of suppressing the high frequency component of the white noise. In the symbol determination device 3 of the first embodiment, the adaptive filter unit 301 of the phase adjustment unit 30 and the adaptive filter unit 401 of the maximum likelihood sequence estimation unit 40 are connected. For this reason, the adaptive filter unit 301 of the phase adjustment unit 30 may be made to perform the processing of compressing the pulse width. The performance of compressing the pulse width is improved as the number of taps is increased. Therefore, when the adaptive filter unit 301 of the phase adjustment unit 30 is caused to perform the processing of compressing the pulse width, it is necessary to determine the number of u pieces of taps 33-1 to 33-$u$ of the adaptive filter unit 301 of the phase adjustment unit 30 in accordance with the degree of compression of the required pulse width.

When the adaptive filter unit 301 of the phase adjustment unit 30 performs the processing of compressing the pulse width, the adaptive filter unit 401 of the maximum likelihood sequence estimation unit 40 may only suppress the high frequency component of the white noise. The ripples due to reflection or the like of the transmission line 2 are already suppressed by the adaptive filter unit 301 of the phase adjustment unit 30. Therefore, the scale of the adaptive filter unit 401 can be reduced by reducing the number of taps 43-1 to 43-$v$ of the adaptive filter unit 401. In this case, the condition of the value v indicating the number of symbols to be taken in by the adaptive filter unit 401 is the number of symbols necessary for converging the update of the tap gain values of the volterra filter unit 61, 71.

In the first embodiment described above, an example in which the linear transversal filter is applied as the adaptive filter unit 301 of the phase adjustment unit 30 and the adaptive filter unit 401 of the maximum likelihood sequence estimation unit 40 is shown, however a filter other than the linear transversal filter such as another linear filter or a nonlinear filter may be applied. Since the phase adjustment unit 30 has only to align the sampling phases, any circuit capable of aligning the sampling phases may be applied. Since the adaptive filter unit 401 of the maximum likelihood sequence estimation unit 40 has only to suppress the high frequency component of the white noise, an arbitrary high frequency component suppression filter may be applied instead of the adaptive filter unit 401.

For example, when the identification device 5 generally includes a clock recovery circuit or the like for aligning the sampling phases of the reception signal sequence $\{r_t\}$ which is provided on the reception side, such the clock recovery circuit may be regarded as the phase adjustment unit 30. In this case, if the high-frequency component of the white noise of the reception signal sequence $\{r_t\}$ whose sampling phase is aligned is small, the adaptive filter unit 401 may be not provided, but the clock recovery circuit or the like may directly give the reception signal sequence $\{r_t\}$ whose sampling phase is aligned to the subtractor 54 of the symbol determination unit 402 and the delay unit 76 of the update processing unit 404.

Second Embodiment

Figure 8:
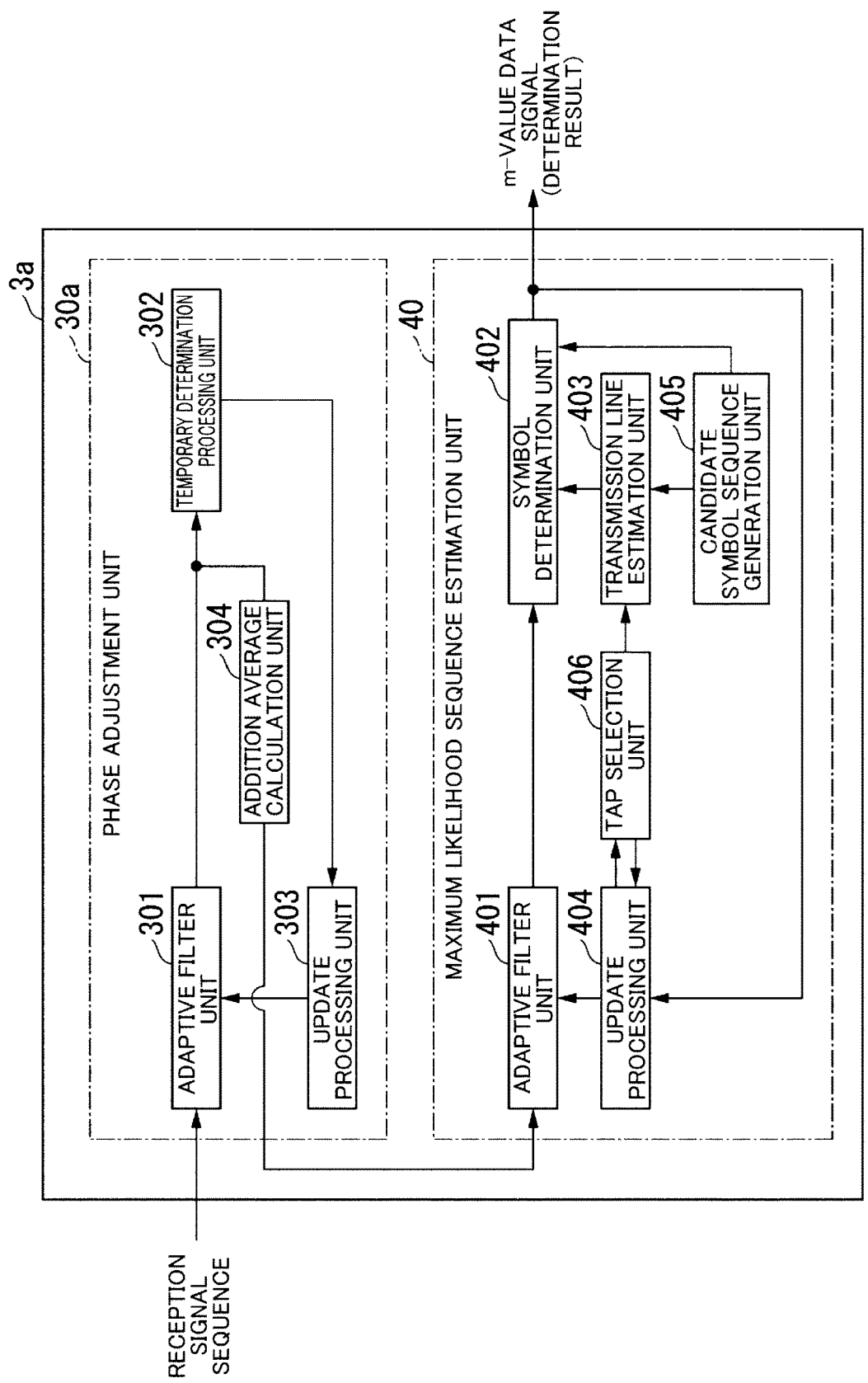
FIG. 8 is a block diagram illustrating an internal configuration of a symbol determination device according to a second embodiment.

FIG. 8 is a block diagram illustrating the configuration of the symbol determination device 3a according to a second embodiment. In the second embodiment, identical reference symbols have been allocated to configurations that are identical to the first embodiment, and different configurations will be described below.

The symbol determination device 3a includes a phase adjustment unit 30a and the maximum likelihood sequence estimation unit 40. The phase adjustment unit 30a includes the adaptive filter unit 301, the temporary determination processing unit 302, the update processing unit 303, and an addition average calculation unit (addition average calculator) 304.

The addition average calculation unit 304 is connected to the adaptive filter unit 301, more specifically, to the adder 34 of the adaptive filter unit 301, and takes in an output value indicated by the equation (8), which is outputted by the adder 34. The addition average calculation unit 304 adds and averages the output value outputted by the adder 34 and outputs it to the adaptive filter unit 401 of the maximum likelihood sequence estimation unit 40.

Processing of the Phase Adjustment Unit According to the Second Embodiment

Figure 9:
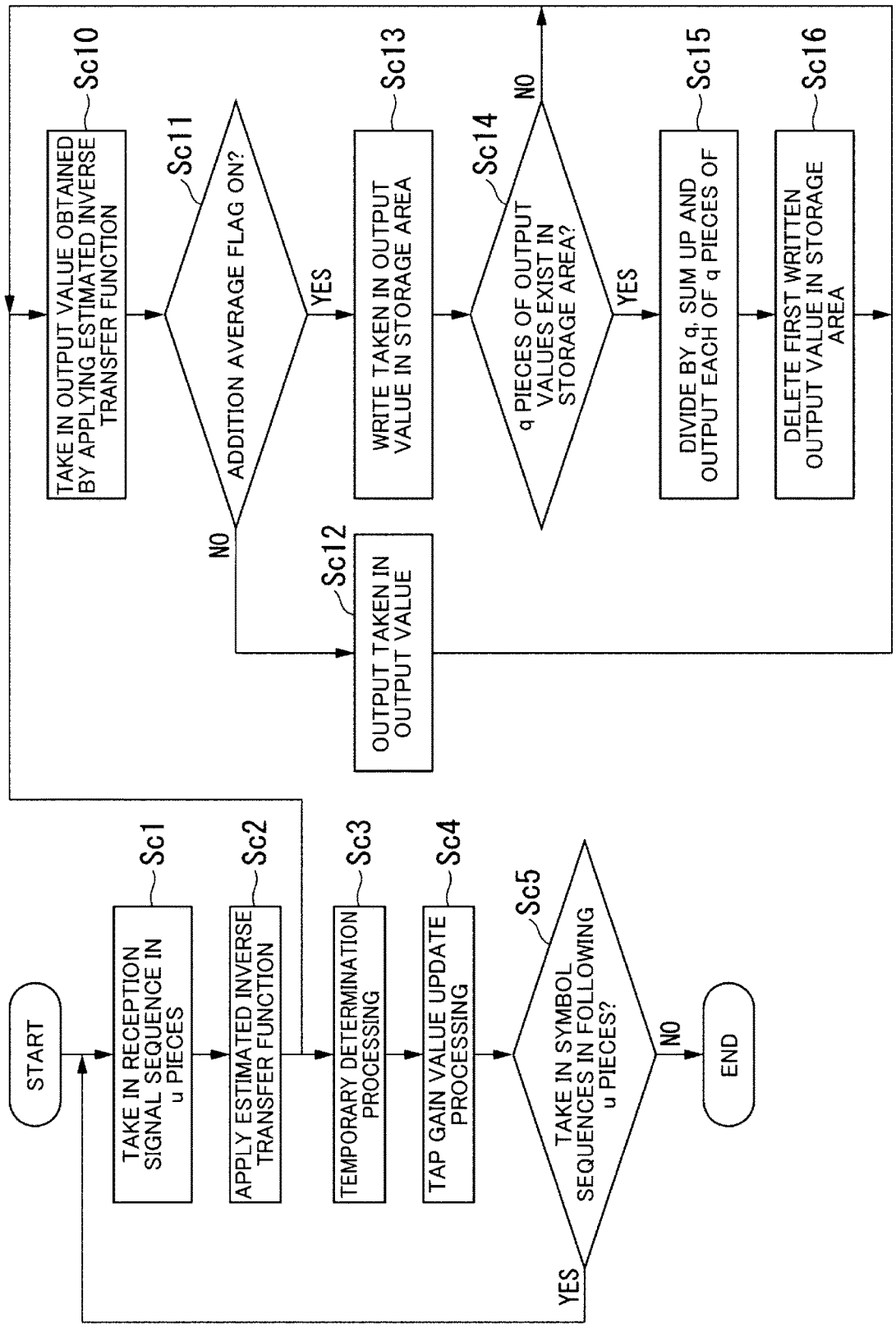
FIG. 9 is a flowchart illustrating a flow of processing of the phase adjustment unit of the symbol determination device according to the second embodiment.

FIG. 9 is a flowchart illustrating a processing flow of the phase adjustment unit 30a of the symbol determination device 3a. As preprocessing for performing the processing of the flowchart shown in FIG. 9, the user of the symbol determination device 3a connects the terminal device for management to the symbol determination device 3a, operates the terminal device for management, and writes "ON" to an area of an addition average flag which is provided in the storage area inside the addition average calculation unit 304 and indicates whether or not to perform processing of the addition average.

The user of the symbol determination device 3 operates the terminal device for management to write a value "q" indicating the number of times of addition average which is appropriately determined in the area of the number of times of addition average provided in the storage area inside the addition average calculation unit 304. where q is an integer equal to or larger than 2.

In the processing of steps Sc1 to Sc5, the same processing as the steps Sa1 to Sa5 of the first embodiment shown in FIG. 6 are performed by the adaptive filter unit 301, the temporary determination processing unit 302 and the update processing unit 303.

The addition average calculation unit 304 takes in the output value indicated by the equation (8) outputted by the adder 34 of the adaptive filter unit 301 in the processing of the step Sc2 (a step Sc10). The addition average calculation unit 304 refers to the internal storage area, and determines whether or not the addition average flag is "ON" (a step Soil). When it is determined that the addition average flag is not "on" (a step Sc11, No), the addition average calculation unit 304 outputs the taken in output value to the adaptive filter unit 401 of the maximum likelihood sequence estimation unit 40 (a step Sc12), and performs the processing of the step Sc10 again.

On the other hand, when it is determined that the addition average flag is "on" (the step Soil, Yes), the addition average calculation unit 304 writes the taken in output value in the internal storage area (a step Sc13). The addition average calculation unit 304 reads the number of times of addition average q from the internal storage area. The addition average calculation unit 304 determines whether q pieces of output values exist in the internal storage area or not (a step Sc14). When it is determined that q pieces of output values do not exist in the internal storage area, the addition average calculation unit 304 performs the processing of the step Sc10 again (the step Sc14, No).

On the other hand, when it is determined that q pieces of output values exist in the internal storage area (the step Sc14, Yes), the addition average calculation unit 304 calculates an output value which are added and averaged obtained by adding each in which q pieces of output values are divided by q. The addition average calculation unit 304 outputs the output value obtained by the addition average to the adaptive filter unit 401 of the maximum likelihood sequence estimation unit 40 (a step Sc15). The addition average calculation unit 304 deletes the earliest output value written from the internal storage area, that is, the oldest output value (a step Sc16), and performs the processing of the step Sc10 again.

The symbol determination device 3a of the second embodiment has the following effects in addition to the effects of the symbol determination device 3 of the first embodiment by providing the addition average calculation unit 304. For example, by transmitting the transmission signal sequence $\{s_t\}$ of a test pattern which determined before the operation, the addition average calculation unit 304 can perform so-called ensemble average by the addition average calculation unit 304. That is, the addition average calculation unit 304 can generate the test sequence in which the white noise is suppressed by performing the addition average of the reception signal sequence $\{r_t\}$ having the same sampling phase. The filter update algorithm processing unit 75 of the maximum likelihood sequence estimation unit 40 converges the tap gain values of the taps of the volterra filter unit 61 by update on the basis of the test sequence generated by the addition average calculation unit 304, and the tap selection unit 406 performs processing for reducing the taps. Thus, the tap selection unit 406 can perform processing for reducing the taps in a state where the influence of the white noise is reduced. Therefore, even in a state where the tap gain values of the adaptive filter unit 401 for suppressing the high frequency component of the white noise is not converged, the determination target reception symbol sequence having the uniform sampling phase and low influence of the white noise can be obtained, it is possible to extract the tap which has a large influence on the expression of the estimated transfer function (H') with more fast and more high accuracy. When the extraction of the tap is completed and the state is shifted to the operation state, the user of the symbol determination device 3a operates the terminal device for management and writes "OFF" to the area of the addition average flag provided in the storage area inside the addition average calculation unit 304, and the processing of step Sc13 to Sc16 can be prevented from being performed.

In the first and second embodiments, as the predetermined update algorithms of the filter update algorithm processing unit 35 of the update processing unit 303 of the phase adjustment unit 30a and the filter update algorithm processing unit 75 of the update processing unit 404 of the maximum likelihood sequence estimation unit 40, an LMS (Least Mean Square) algorithm, an RLS (Recursive Least Square) algorithm, and the like are applied.

As the loss function of the predetermined update algorithm used for updating the tap gain values of the volterra filter unit 61, 71 of the filter update algorithm processing unit 75 of the update processing unit 404 of the maximum likelihood sequence estimation unit 40, the loss function using Lasso regression may be applied instead of the loss function shown by the equation (18) which is generally used.

[Math. 18]

$$e_n = y_n - d_n \quad (18)$$

In the equation (18), $e_n$ is n-th loss function, $y_n$ is n-th output value of the volterra filter unit 71, and $d_n$ is n-th output value of the delay unit 76.

For example, a case where Lasso regression is used for the LMS algorithm will be described. It is assumed that there are k pieces of taps of the volterra filter unit 71, k pieces of tap gain values before update are expressed by the following equation (19), and k pieces of tap gain values after update are expressed by the following equation (20). As the k pieces of tap gain values before update, the filter update algorithm processing unit 75 stores the tap gain values calculated immediately before in the internal storage area and the tap gain values calculated immediately before may be used or, in the step Sb 13 of FIG. 7, the tap gain values which may be partially rewritten to "0" in the step Sb9 in which the tap selection unit 406 stores in the internal storage area may be used.

[Math. 19]

$$w = [w_1, \ldots, w_K] \quad (19)$$

[Math. 20]

$$w' = [w_1', \ldots, w_K'] \quad (20)$$

The relationship between the tap gain values before update and the tap gain values after update can be expressed as the following equation (21).

[Math. 21]

$$w' = w + \Delta w \quad (21)$$

The vector $\Delta W$ of the second term on the right side of the following equation (21) is expressed y the following equation (22).

[Math. 22]

$$\Delta w = \mu u_n e_n \quad (22)$$

In the equation (22), µ is a step size parameter, and is a constant determined as appropriate. The vector un is an input sequence of the volterra filter unit 71, and in the first and second embodiments, when an n-th $y_n$, that is, an n-th output value of the volterra filter unit 71 is obtained, and is the sequence of the sequence of the estimated transmission symbol to the volterra filter unit 71 ($a_{t-(x-1)/2}, \ldots, a_t, \ldots, a_{t+(x-1)/2}$). The loss function $e_n$ is expressed by the following equation (23).

[Math. 23]

$$e_n = (y_n - d_n)^2 + \lambda \Sigma_{j=1}^{K} |w_j| \quad (23)$$

In the equation (23), two items on the right side of the equation (23) are L1 norm, λ included in the two items is a hyper parameter, and a constant which is suitably determined.

By using the loss function $e_n$ using the Lasso regression shown by the equation (23), the tap gain values having the small influence to the generation of the estimated reception symbol sequence generated by the volterra filter unit 61 of the transmission line estimation unit 403 can be close to "0". Therefore, the magnitude of the tap gain values becomes clear, and the tap selection unit 406 can easily discriminate the tap to be reduced even if the tap gain threshold value preset in the tap selection unit 406 is not strictly determined.

Although the first and second embodiments described above show examples in which the Viterbi algorithm is applied in the processing of the maximum likelihood sequence estimation of the symbol determination unit 402, the BCJR algorithm may be applied.

(Simulation Result)

Figure 10:
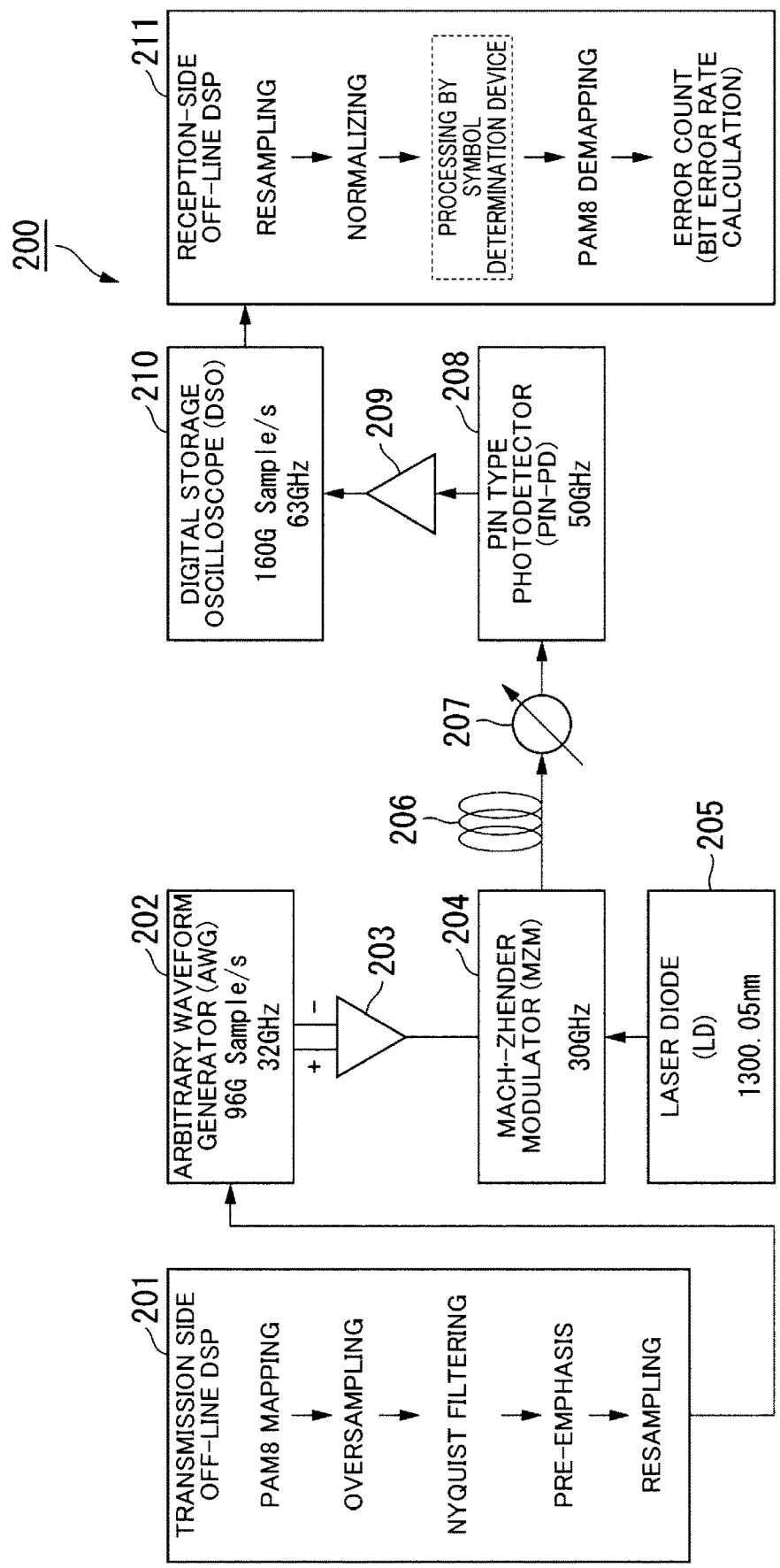
FIG. 10 is a block diagram illustrating a configuration of a communication system used for a simulation.

FIG. 10 is a block diagram illustrating a configuration of a communication system 200 used for measuring the effect of the symbol determination device 3, 3*a* according to the first and second embodiments. The communication system 200 is a simulation system for performing an O-band optical transmission experiment of 255 Gbps, PAM 8, and 20 km, and includes a transmission side off-line DSP 201, an arbitrary waveform generator (hereinafter, referred to as "AWG" (Arbitrary Waveform Generator)) 202, an amplifier 203, and a Mach-Zhender modulator (hereinafter referred to as "MZM" (Mach Zhender Modulator)) 204, a laser diode (hereinafter referred to as "LD" (Laser Diode) 205, an optical fiber transmission line 206, a variable optical attenuator (hereinafter referred to as "VOA" (Variable Optical Attenuator)) 207, a PIN type photodiode (hereinafter referred to as "PIN-PD" (Photo diode))) 208, an amplifier 209, a digital storage oscilloscope (hereinafter referred to as "DSO" (Digital Storage Oscilloscope)) 210, and a reception side off-line DSP 211.

The transmission-side off-line DSP 201 performs PAM8 mapping, oversampling, Nyquist filtering, Pre-emphasis and re-sampling for the transmission data to generate an m-value data signal of the m-value 8. The AWG 202 has the performance of 96 GSample/s and 32 GHz, takes in the m-value data signal generated by the transmission side off-line DSP 201, and generates and outputs a transmission signal sequence of 255 Gbps on the basis of the taken in m-value data signal. The amplifier 203 amplifies the transmission signal sequence outputted by the AWG 202. LD 205 emits a laser light with a wavelength of 1300.05 nm in O band. The MZM 204 generates modulated light by intensity-modulating the laser light emitted from the LD 205 at 30 GHz on the basis of a transmission signal sequence outputted by the amplifier 203, and transmits the generated modulated light to the optical fiber transmission line 206.

The optical fiber transmission line 206 has a length of 20 km and is a SSMF (Standard Single Mode Fiber) with a wavelength dispersion amount of −21.7 ps/nm and transmits the modulated light transmitted from the MZM 204. The VOA 207 adjusts the power of the light received by the PIN-PD 206. The PIN-PD 208 has a performance of a cutoff frequency of 50 GHz, and converts the intensity-modulated light into a reception signal sequence of the analogue electric signal by the direct detection system. The amplifier 209 amplifies and outputs the reception signal sequence of the analogue electric signal outputted from the PIN-PD 208. The DSO 210 has a performance of 160 GSample/s, 63 GHz, and takes in the reception signal sequence of the analogue electric signal outputted from the amplifier 209, and converts the reception signal sequence into the reception signal sequence of the digital signal.

The reception side off-line DSP 211 takes in the reception signal sequence of the digital electric signal generated by conversion by the DSO 210. In the reception side off-line DSP 211, the symbol determination device 3, 3*a* according to the first and second embodiments, the symbol determination device 90 for performing symbol determination by a conventional MLSE system, the symbol determination device (hereinafter, this symbol determination device is referred to FFE symbol determination device) for performing FFE which is the general used and the compensation technique can be used with switching.

The reception side off-line DSP 211 performs resampling and normalizing to the reception signal sequence taken in from the DSO 210, identifies the estimated transmission symbol by any of the symbol determination device 3, 3*a*, the symbol determination device 90 or the FFE symbol determination device, performs PAM8 demapping and restores the transmission data. The reception side off-line DSP 211 calculates a bit error rate of the restored transmission data.

Figure 11:
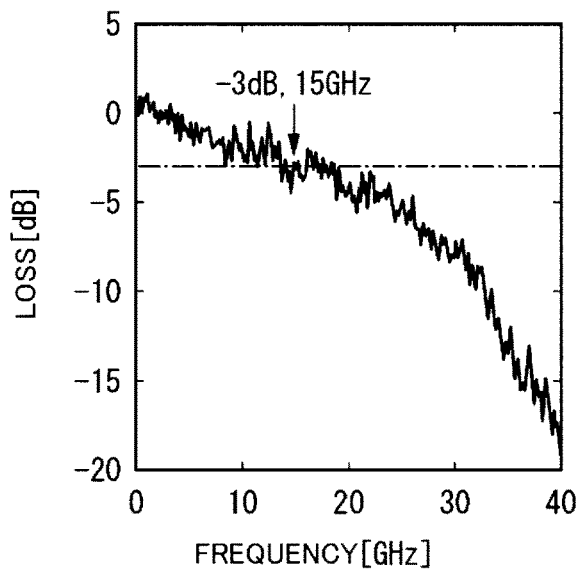
FIG. 11 is a graph illustrating a frequency characteristics of an entire transmission line measured in the communication system used for the simulation.

FIG. 11 is a graph illustrating the frequency characteristics of the entire transmission line observed at the output terminal of the amplifier 209. As shown in the graph, the 3 dB band in the entire transmission line is 15 GHz.

Figure 12:
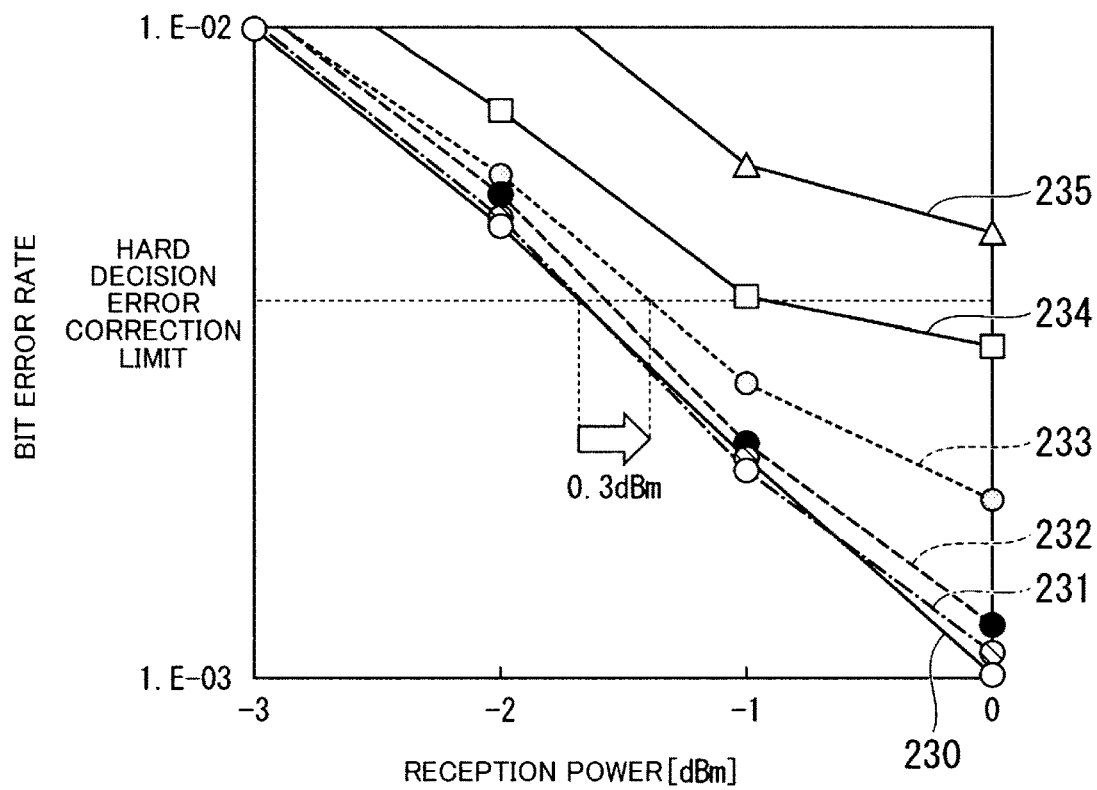
FIG. 12 is a graph illustrating a relationship between a bit error rate and the reception power measured in the communication system used for the simulation.
Figure 13:
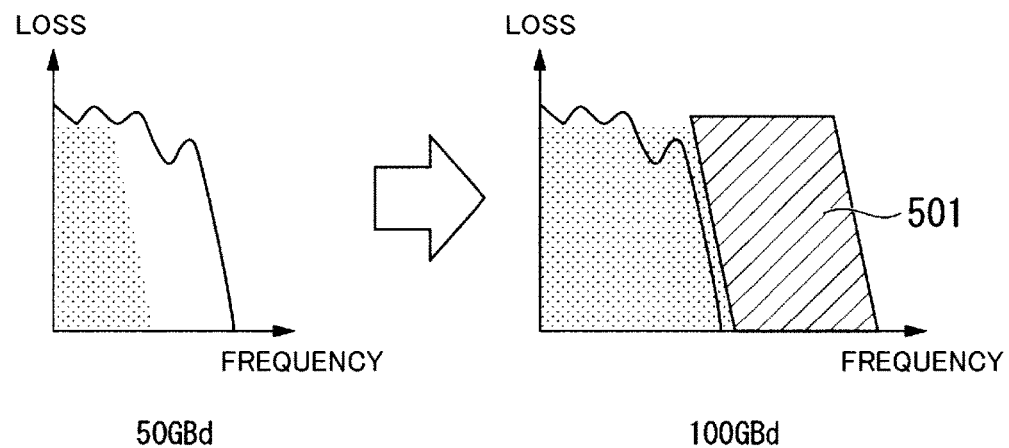
FIG. 13 is a graph illustrating an influence of band limitation of a device when transmission capacity increases.
Figure 14:
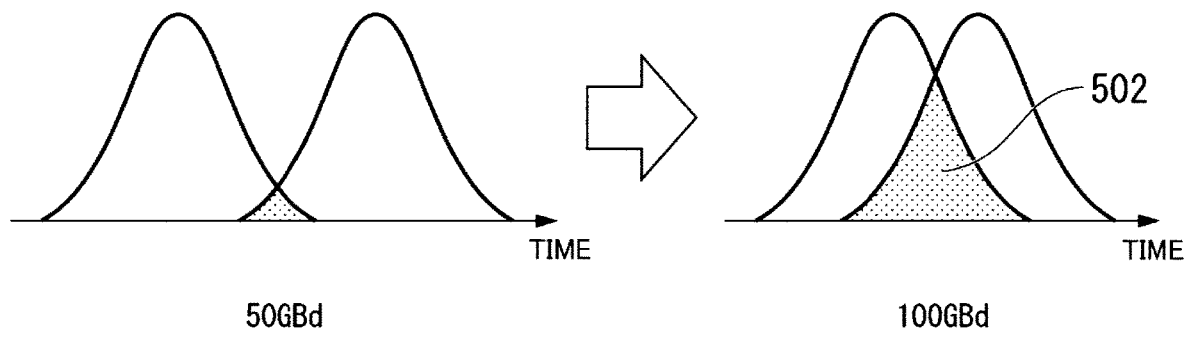
FIG. 14 is a graph illustrating an influence of wavelength dispersion when transmission capacity increases.
Figure 15:
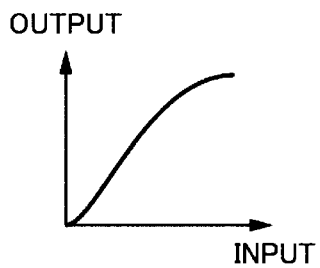
FIG. 15 is a graph illustrating input/output characteristics of a driver and a light receiver.
Figure 16:
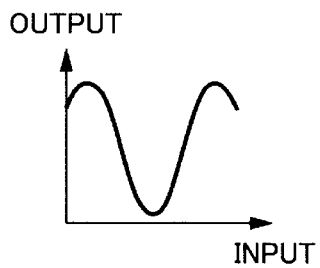
FIG. 16 is a graph illustrating input/output characteristics of a modulator.
Figure 17:
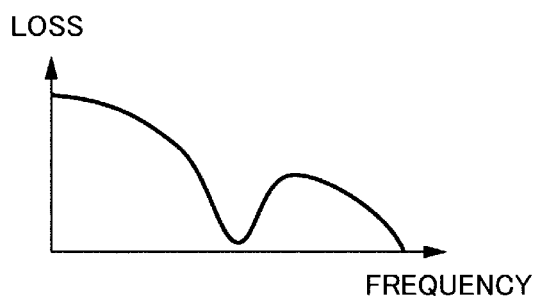
FIG. 17 is a graph illustrating loss characteristics in the frequency region.

FIG. 12 is a graph illustrating the relationship between the bit error rate and the reception power calculated by the reception side off-line DSP 211, and it can be said that the characteristic is better when the reception power is lower and the bit error rate is lower.

The "hard decision error correction limit" indicated in the vertical bit error rate is an error rate indicating transmission performance capable of performing error correction sufficiently when an FEC (Forward Error Correction) of hard decision is used, and is an index for measuring performance of signal processing such as MLSE.

In a graph of FIG. 12, a graph indicated by reference numeral 235 indicates a characteristic when the FFE symbol determination device is used, and in the FFE symbol determination device, even when the reception power is 0 [dBm], the bit error rate cannot reach the hard decision error correction limit. A graph indicated by reference numeral 234 shows the characteristics of the conventional symbol determination apparatus 90 for performing MLSE, and indicates that the bit error rate exceeds the hard decision error correction limit when the reception power exceeds the node −1 [dBm].

A graph indicated by each of the reference numerals 230 and 233 is a graph in the case where the symbol determination device 3, 3*a* according to the first and second embodiments is used. As described above, the number of third-order taps of the volterra filter unit 61, 71 of the symbol determination device 3, 3*a* according to the first and second embodiments is 35 pieces. The graph indicated by the reference numeral 230 shows characteristics when all the third-order taps are used, that is, when the tap reduction rate is 0%, and shows the best characteristics among all the graphs. The graph indicated by the reference numeral 231 shows the characteristics when about 14% of the third-order taps, that is, 5 pieces, are reduced, and there is no significant change in comparison with the case where the reduction rate is 0%.

The graph indicated by the reference numeral 232 shows the characteristics when about 43% of the third-order taps, that is, 15 taps, are reduced. The graph indicated by the reference numeral 233 shows the characteristics when about 71% of the third order taps, that is, 25 taps, are reduced. When the reduction rate of the tap becomes 43%, 71%, the characteristic is deteriorated as compared with the case where the reduction rate is 0%, 14%, but the characteristic is better than that of the FFE symbol determination device and the symbol determination device 90. When comparing the case where the reduction rate is 71% and the case where the reduction rate is 0%, the difference in the reception power required for maintaining the bit error rate at the hard decision error correction limit is staying around 0.3 [dBm], It can be seen that the symbol determination device 3 can reduce the number of taps while suppressing the deterioration of transmission performance to reduce the calculation amount.

In the configuration according to the first and second embodiments described above, in the processing shown in step Sb8, Sb9, and Sb11 in FIG. 7, the determination processing using the inequality with the equal sign is performed. However, the present invention is not limited to the present embodiment, and the determination processing of "whether or not it is equal to or less than" is only one example, and it may be replaced with a determination process of "whether or not the value is less than".

The symbol determination device 3, 3*a* of the above-described embodiment may be realized by a computer. In this case, the program for realizing this function is recorded in the computer readable and writable recording medium, the program recorded in the recording medium is read to a computer system, and executed, thereby the function may be realized. Further, the aforementioned program can also be provided through a network such as the Internet. Note that the "computer system" mentioned here includes an OS and hardware such as peripheral equipment. Further, the "computer-readable recording medium" represents a transportable medium such as a flexible disk, a magneto-optical disk, a ROM, and a CD-ROM and a storage device such as a hard disk embedded in the computer system. In addition, the "computer-readable recording medium" may also include a recording medium that dynamically retains a program for a short period of time like a communication line used to transmit the program via a network such as the Internet or a communication line such as a telephone line and a recording medium that retains a program for a certain period of time like a server or a volatile memory inside the computer system that serves as a client in that case. Moreover, the program described above may be any of a program for realizing a part of the functions described above, a program capable of realizing the functions described above in combination with a program already recorded in a computer system, and a program for realizing the functions using a programmable logic device such as an FPGA (Field Programmable Gate Array).

Although the embodiments of the present invention have been described in detail with reference to the drawings, specific configurations are not limited to these embodiments, and designs and the like within a range that does not deviating from the gist of the present invention are also included.

INDUSTRIAL APPLICABILITY

The device can be utilized as a reception side device in transmission of 400 GbE and 800 GbE.

REFERENCE SIGNS LIST

3 Symbol determination device
30 Phase adjustment unit
40 Maximum likelihood sequence estimation unit
301 Adaptive filter unit
302 Temporary determination processing unit 303 Update processing unit
401 Adaptive filter unit
402 Symbol determination unit
403 Transmission line estimation unit
404 Update processing unit
405 Candidate symbol sequence generation unit
406 Tap selection unit

The invention claimed is:

1. A symbol determination device, comprising:
a candidate symbol sequence generator configured to generate a plurality of candidate symbol sequences that are candidates for a transmission symbol sequence;
a transmission line estimator configured to have a non-linear filter including a plurality of taps and generate a plurality of estimated reception symbol sequences on the basis of an estimated transfer function of the transmission line represented by a tap gain value applied to each tap and the plurality of candidate symbol sequences;
a symbol determiner configured to determine the transmission symbol by maximum likelihood sequence estimation based on a determination target reception symbol sequence obtained from the reception signal sequence and each of the plurality of estimated reception symbol sequences, and identify the estimated transmission symbol corresponding to the determination target reception symbol sequence;
an update processor unit configured to calculate new tap gain values based on the determination target reception symbol sequence and the estimated transmission symbol sequence identified by the symbol determiner, and update the estimated transfer function by applying the calculated new tap gain values to the taps of the transmission line estimator; and
a tap selector configured to select the tap to be used on the basis of the magnitude of the new tap gain values calculated by the update processor and a predetermined tap gain threshold value.

2. The symbol determination device according to claim 1, wherein
the update processor calculates the new tap gain values using a loss function to which Lasso regression is applied.

3. The symbol determination device according to claim 1 comprising
a phase adjuster configured to align a sampling phase of the reception signal sequence and output the reception signal sequence in which the sampling phase is aligned, wherein
the symbol determiner takes in the symbol of the reception signal sequence in which the sampling phase is aligned outputted by the phase adjuster.

4. The symbol determination device according to claim 3 comprising
A high-frequency component suppression filter-unit configured to suppress a high-frequency component of the reception signal sequence outputted by the phase adjuster, wherein
the symbol determiner takes in the reception symbol sequence in which the high-frequency component is suppressed by the high frequency component suppression filter, as the determination target reception symbol sequence.

5. The symbol determination device according to claim 3, wherein
the phase adjuster comprising:
an adaptive filter configured to apply an estimated inverse transfer function of the transmission line to the reception signal sequence;
A temporary determination processor configure to perform a temporary determination of a transmission symbol by performing a hard decision on the reception signal sequence to which the estimated inverse transfer function is applied; and
an update processor configured to update the estimated inverse transfer function of the adaptive filter-unit based on the reception signal sequence to which the estimated inverse transfer function is applied and the sequence of the transmission symbol.

6. The symbol determination device according to claim 5, wherein
the adaptive filter outputs the reception signal sequence to which the estimated inverse transfer function is applied as the reception signal sequence in which the sampling phases are aligned,
or
the phase adjustment device further comprising
an addition average calculator configured to perform addition average on the output values outputted by the adaptive filter, and outputs a sequence of the output values obtained by performing the addition average as the reception signal sequence in which the sampling phases are aligned.

7. The symbol determination device according to claim 1, wherein
the tap selector configured to repeat the periodic selection of the tap on the basis of the magnitude of the new tap gain values calculated by the update processor and the tap gain threshold value.

8. A tap selection method comprising:
generating by the candidate symbol sequence generator the plurality of candidate symbol sequences to be candidates of the transmission symbol sequence;
generating by the transmission line estimator having the nonlinear filter including the plurality of taps the plurality of estimated reception symbol sequences on the basis of an estimated transfer function of the transmission line represented by the tap gain value applied to each of the taps and the plurality of candidate symbol sequences;
determining by the symbol determiner the transmission symbol by the maximum likelihood sequence estimation on the basis of the determination target reception symbol sequence obtained from the reception signal sequence and each of the plurality of estimated reception symbol sequences, and identifying the estimated transmission symbol corresponding to the determination target reception symbol sequence;
calculating by the update processor the new tap gain values on the basis of the determination target reception symbol sequence and the estimated transmission symbol sequence identified by the symbol determiner and updating the estimated transfer function by applying the calculated new tap gain values to the taps of the transmission line estimator; and
selecting by the tap selector the tap to be used on the basis of the magnitude of the new tap gain values calculated by the update processor and the predetermined tap gain threshold value.

* * * * *